(12) United States Patent
Jung et al.

(10) Patent No.: US 9,239,949 B2
(45) Date of Patent: Jan. 19, 2016

(54) METHOD FOR USER FUNCTION OPERATION BASED ON FACE RECOGNITION AND MOBILE TERMINAL SUPPORTING THE SAME

(71) Applicant: Samsung Electronics Co., Ltd., Gyeonggi-do (KR)

(72) Inventors: Jeehye Jung, Seoul (KR); Bokun Choi, Seoul (KR); Doosuk Kang, Gyeonggi-do (KR); Changho Lee, Gyeonggi-do (KR); Sae Mee Yim, Gyeonggi-do (KR); Euichang Jung, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 81 days.

(21) Appl. No.: 14/144,950

(22) Filed: Dec. 31, 2013

(65) Prior Publication Data

US 2014/0192134 A1 Jul. 10, 2014

(30) Foreign Application Priority Data

Jan. 7, 2013 (KR) ........................ 10-2013-0001414

(51) Int. Cl.
| | |
|---|---|
| *H04N 7/14* | (2006.01) |
| *H04N 5/232* | (2006.01) |
| *G06K 9/00* | (2006.01) |
| *H04N 21/414* | (2011.01) |

(Continued)

(52) U.S. Cl.
CPC ........ *G06K 9/00302* (2013.01); *G06K 9/00255* (2013.01); *H04L 12/1827* (2013.01); *H04N 5/23241* (2013.01); *H04N 7/147* (2013.01); *H04N 21/41407* (2013.01); *H04N 21/44008* (2013.01); *H04N 21/44218* (2013.01); *H04N 21/4788* (2013.01); *H04L 51/10* (2013.01)

(58) Field of Classification Search
CPC .......... G06K 9/00255; G06K 9/00302; H04N 5/23241; H04N 7/147
USPC .................. 348/14.02, 77, 376, 14.08, 14.09; 382/100, 128; 434/236; 704/246; 715/205, 704, 768, 758; 725/62; 379/93.21; 707/755; 709/204
See application file for complete search history.

(56) References Cited

U.S. PATENT DOCUMENTS

| | | | |
|---|---|---|---|
| 6,307,948 | B1 | 10/2001 | Kawasaki et al. |
| 7,003,731 | B1 * | 2/2006 | Rhoads et al. ................. 715/768 |

(Continued)

FOREIGN PATENT DOCUMENTS

| | | |
|---|---|---|
| EP | 1 443 465 A1 | 8/2004 |
| KR | 10-2011-0012491 A | 2/2011 |
| WO | 2012/139276 A1 | 10/2012 |

*Primary Examiner* — Gerald Gauthier
(74) *Attorney, Agent, or Firm* — Cha & Reiter, LLC

(57) ABSTRACT

A mobile device user interface method activates a camera module to support a video chat function and acquires an image of a target object using the camera module. In response to detecting a face in the captured image, the facial image data is analyzed to identify an emotional characteristic of the face by identifying a facial feature and comparing the identified feature with a predetermined feature associated with an emotion. The identified emotional characteristic is compared with a corresponding emotional characteristic of previously acquired facial image data of the target object. In response to the comparison, an emotion indicative image is generated and the generated emotion indicative image is transmitted to a destination terminal used in the video chat.

23 Claims, 14 Drawing Sheets

(51) Int. Cl.
*H04N 21/44* (2011.01)
*H04N 21/442* (2011.01)
*H04N 21/4788* (2011.01)
*H04L 12/18* (2006.01)
*H04L 12/58* (2006.01)

(56) References Cited

U.S. PATENT DOCUMENTS

| | | | |
|---|---|---|---|
| 7,669,135 B2 * | 2/2010 | Cunningham | G06F 3/0219 455/466 |
| 7,903,171 B2 * | 3/2011 | Takabatake et al. | 348/376 |
| 8,230,337 B2 * | 7/2012 | Rhoads et al. | 715/704 |
| 8,447,065 B2 * | 5/2013 | Hung et al. | 382/100 |
| 8,693,648 B1 * | 4/2014 | Drugge | G06Q 50/01 348/14.08 |
| 8,832,190 B1 * | 9/2014 | Leske | H04L 12/1822 709/204 |
| 8,908,005 B1 * | 12/2014 | Leske | H04N 7/152 348/14.09 |
| 9,001,178 B1 * | 4/2015 | Leske et al. | H04N 7/155 348/14.08 |
| 9,031,293 B2 * | 5/2015 | Kalinli-Akbacak | G10L 25/63 382/128 |
| 9,047,710 B2 * | 6/2015 | Kwon | G06T 13/40 |
| 9,077,850 B1 * | 7/2015 | Groves | H04N 7/15 |
| 2010/0085416 A1 | 4/2010 | Hegde et al. | |
| 2010/0141749 A1 * | 6/2010 | Murakami | H04N 21/4223 348/77 |
| 2012/0120219 A1 | 5/2012 | Wang | |
| 2012/0155773 A1 | 6/2012 | Tsukamoto et al. | |
| 2012/0233531 A1 * | 9/2012 | Ma et al. | 715/205 |
| 2012/0245941 A1 * | 9/2012 | Cheyer | 704/246 |
| 2012/0281063 A1 | 11/2012 | Pace | |
| 2012/0327172 A1 * | 12/2012 | El-Saban | G06K 9/00228 348/14.02 |
| 2013/0086615 A1 * | 4/2013 | Williams et al. | 725/62 |
| 2013/0198210 A1 * | 8/2013 | Lee | G06F 17/30861 707/755 |
| 2013/0337421 A1 * | 12/2013 | Gerken, III | G09B 5/06 434/236 |
| 2014/0022328 A1 * | 1/2014 | Gechter | G06Q 30/06 348/14.02 |
| 2014/0157153 A1 * | 6/2014 | Yuen | A63F 13/795 715/758 |
| 2014/0192134 A1 * | 7/2014 | Jung | G06K 9/00255 348/14.02 |

* cited by examiner

METHOD FOR USER FUNCTION OPERATION BASED ON FACE RECOGNITION AND MOBILE TERMINAL SUPPORTING THE SAME

CLAIM OF PRIORITY

This application claims the benefit under 35 U.S.C. §119(a) of a Korean patent application filed on Jan. 7, 2013 in the Korean Intellectual Property Office and assigned Serial No. 10-2013-0001414, the entire disclosure of which is hereby incorporated by reference.

BACKGROUND

1. Technical Field

The present system concerns a user interface employing face recognition in a mobile terminal in the bidirectional communication of images, for example.

2. Description of the Related Art

Known mobile terminals have a video call capability including a camera module supporting bidirectional communication of images. In response to a call being established, the mobile terminal provides a video call menu. Further, in response to a corresponding counterpart user accepting the video call request, the mobile terminal may capture and send images. In a video call, it is desirable for a terminal to provide low latency and high data throughput as images are captured and sent in real time. As the amount of data transmitted is a major factor determining call related charges, a video call may be an expensive means of communication. Hence, although a video call enables face-to-face conversation, it may be regarded as a rarely used feature or a feature used in special situations. In addition, during a video call, the camera module remains on continuously to capture images to be sent in real time. This consumes a substantial amount of power and more than just a voice call, reducing continuous operating time of the mobile terminal between battery re-charging and shortening battery lifetime.

SUMMARY

A system addresses the above mentioned deficiencies and/or associated problems. The system provides a user interface based on face recognition supporting bidirectional communication of still images in response to detected change in facial expression of a speaking user. A system provides a user interface employing face recognition in a mobile terminal in the bidirectional communication of images, for facilitating video call functions and data management whilst reducing power consumption.

A mobile device user interface method activates a camera module to support a video chat function and acquires an image of a target object using the camera module. In response to detecting a face in the captured image, the facial image data is analyzed to identify an emotional characteristic of the face by identifying a facial feature and comparing the identified feature with a predetermined feature associated with an emotion. The identified emotional characteristic is compared with a corresponding emotional characteristic of previously acquired facial image data of the target object. In response to the comparison, an emotion indicative image is generated and the generated emotion indicative image is transmitted to a destination terminal used in the video chat.

In a feature, a facial feature is identified and the identified feature is compared with a predetermined feature associated with an emotion by identifying the facial feature by feature boundary edge detection comprising a determined transition in pixel luminance, comparing the identified feature with a predetermined feature associated with an emotion in mapping information and using a transformation of the identified image features comprising at least one of, translation, scaling and rotation operations and transmitting, when the identified emotional characteristic is identical to the previous emotional characteristic, a message indicating similarity between current and previous emotional characteristics without generation and transmission of an emotion indicative image. The activating of the camera module is performed in response to at least one of, expiration of a time period duration in the video chat, activation of a message application supporting the video chat, generation of an input event for writing a message during the video chat, generation of an input event for sending a written message during the video chat, or generation of an input event for reading or replying to a received message. The acquiring of the image of a target object comprises at least one of: selecting an image from among a sequence of preview images provided by the camera module; and acquiring an image of the target object after output of a predetermined notification.

In another feature, the generating of the emotion indicative image comprises generating an emotion indicative image of a predetermined size by adjusting the camera acquired image resolution and size and incorporating textual information concerning the identified emotional characteristic into the emotion indicative image. In response to the determination the acquired image does not contain a face of the target object, a message is generated indicating user absence and the message indicating user absence is sent to the destination terminal.

In another feature, the user interface method includes receiving an emotion indicative image and related information identifying an emotion derived in response to analysis of an image captured by a counterpart terminal during a video chat and outputting an emotion indicative image extracted from the received emotion indicative image related information. The receiving of the emotion indicative image related information comprises receiving textual information concerning an identified emotional characteristic and receiving a message indicating similarity of an emotion indicative image when an emotional characteristic associated with a currently received emotion indicative image is similar to an emotional characteristic associated with a previously received emotion indicative image. The emotion indicative image comprises outputting the textual information together with the output emotion indicative image. The outputting of the emotion indicative image comprises outputting an emotion indicative image region in a display image used to output emotion indicative images, outputting a chat message region used to output messages sent to and received from the counterpart terminal and outputting an input region used to enter information for a chat session.

In a further feature the method receives data indicating an input event for selecting an emotion indicative image output in the emotion indicative image region, the method sends an original image request for the selected emotion indicative image to the counterpart terminal and displays the selected emotion indicative image in a full screen format. In response to received data indicating an input event, the method selects an emotion indicative image to output in the emotion indicative image region; and performs a slide show of emotion indicative images output in the emotion indicative image region. The method further outputs a chat message region used to output messages in a displayed image and outputs an input region used to enter information for a chat session. In response to received data indicating an input event, the method browses a record of sent and received emotion indicative images and groups sent and received emotion indicative images by user and outputs the grouped emotion indicative images for an individual user and outputs messages, which are received in association with the emotion indicative images, together with the respective emotion indicative images. The method receiving a message indicating user absence, in response to a determination the image captured by the counterpart terminal does not contain a face. Further, a user absence indication is displayed, in response to reception of a message indicating user absence and displays an emotion indicative image associated with a newly received message in a manner easily distinguished from other emotion indicative images.

In yet another feature, a user interface system activates a camera module in response to a predetermined command and acquires an image of a target object using the camera module. In response to detecting a face in the acquired image, the system analyzes the facial image data to identify an emotional characteristic of the face by identifying a facial feature and compares the identified feature with a predetermined feature associated with an emotion. The system determines similarity between the identified emotional characteristic of the face and a previously determined emotional characteristic of a face in a previously acquired image. In response to the identified emotional characteristic being dissimilar to the previously determined emotional characteristic, the system generates an emotion indicative image based on the acquired image and transmits the generated emotion indicative image to a counterpart terminal, and in response to the identified emotional characteristic being similar to the previously determined emotional characteristic, transmits a message indicating similarity between the identified emotional characteristic and the previously determined emotional characteristic.

In yet a further feature a user interface method activates a camera module in response to generation of an event and acquires an image of a target object using the camera module. In response to detecting a face in the captured image, the method analyzes the facial image data to identify an emotional characteristic of the face and outputs emotional characteristic information and an emotion indicative image in response to the analysis of the facial image data. The method stores the emotional characteristic information and emotion indicative image and temporarily stores an original image of the emotion indicative image. The activation of the camera module is performed in response to at least one of, activation of a user function, writing of a message during a chat session, issuance of a message transmission request during a chat session, and collection of a voice signal during a video call.

In an additional feature a user interface in a mobile terminal, comprises a camera module to acquire an image of a target object in response to generation of data indicating an event during a video chat; and a control unit in response to detecting a face in the acquired image, to control, analyzing the facial image data to identify an emotional characteristic of the face by identifying a facial feature and comparing the identified feature with a predetermined feature associated with an emotion, determining similarity between the identified emotional characteristic of the face and a previously determined emotional characteristic of a face in a previously acquired image, and in response to the identified emotional characteristic being dissimilar to the previously determined emotional characteristic, generating an emotion indicative image based on the acquired image and transmitting the generated emotion indicative image to a counterpart terminal, and in response to the identified emotional characteristic being similar to the previously determined emotional characteristic, transmitting a message indicating similarity between the identified emotional characteristic and the previously determined emotional characteristic. A display unit displays textual emotional characteristic information as an overlay on a region where an emotion indicative image is displayed. Upon generation of an input event for selecting one emotion indicative image in the emotion indicative image region, the display unit displays the selected emotion indicative image in a full screen format or outputs a slide show of emotion indicative images related to the selected emotion indicative image. The control unit controls output of at least one of, lamp flickering, vibration of a pattern, a sound notification, a highlight, or a popup window to announce image acquisition using the camera module. The video chat supports an instant messaging service or a video call service.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION

Figure 1:
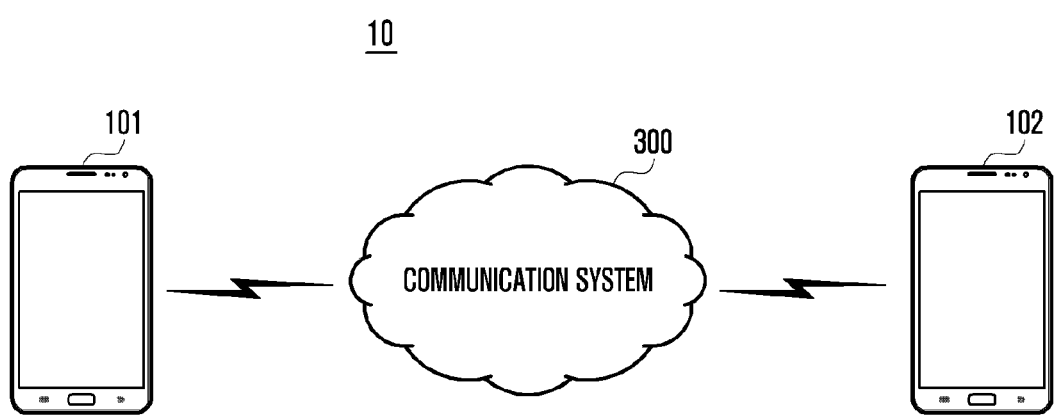
FIG. 1 shows a system supporting a message function based on face recognition according to invention principles.

Hereinafter, exemplary embodiments of the present disclosure are described in detail with reference to the accompanying drawings. Detailed descriptions of well-known functions and structures incorporated herein may be omitted to avoid obscuring the subject matter of the present disclosure. Detailed descriptions of components having substantially the same configurations and functions may also be omitted. In the drawings, some elements are exaggerated or only outlined in brief, and thus may be not drawn to scale. The present disclosure is not limited by relative sizes of objects and intervals between objects in the drawings.

In the following description, a message function is used as a primary example of a user function based on face recognition. However, the present disclosure is not limited thereto. The present disclosure may be applied to any user function of a mobile terminal involving facial image capture and transmission, such as a video call function.

FIG. 1 shows system 10 supporting a message function based on face recognition. Support system 10 includes a sender terminal 101, a receiver terminal 102, and a communication system 300 performing data transmission between the sender terminal 101 and the receiver terminal 102. A camera is used to capture a facial image of a user; the captured image is analyzed to detect emotional change of the user; and whether to send the captured image or an emotion image is determined according to the analysis result. Hence, the support system 10 may produce video call effects by sending facial emotion images. In particular, according to additional settings, the support system 10 may transmit an emotion indicative image in response to a detected emotional change, significantly reducing the amount of data sent while sustaining a video call effect. The support system 10 allows the camera to operate in response to the message function being active and a preset condition being satisfied, reducing power consumed by the camera. The support system 10 enables mobile terminals to produce video call effects in response to a message function and to operate with substantially less power consumption in comparison to a video call.

When a video chat mode corresponding to a message function based on face recognition is entered in response to a user request, the sender terminal 101 activates a camera module in response to occurrence of a preset event condition to capture a facial image of the user and analyze the captured facial image. The sender terminal 101 may send an emotion indicative image and associated analysis information, producing video call effects with reduced data transmission resources. When the captured facial image indicates an emotional state substantially identical to the previous emotional state, the sender terminal 101 may skip transmission of the captured facial image. Selective transmission of a captured image may be performed at regular intervals during activation of the message function or performed in response to the sender terminal 101 sending a message. The sender terminal 101 may output a facial emotion indicative image on a display unit thereof.

The sender terminal 101 may include a camera module, a message function program supporting instant messaging or chatting, and a communication unit to send and receive captured images and messages. For emotion analysis, the sender terminal 101 supports emotion classification according to changes in feature elements of the face, such as eyes, nose, ears, forehead, cheekbones, chin, cheeks and facial appearance. For example, the sender terminal 101 may be equipped with an emotion classification database to support identification of an emotional state of the user on the basis of eye shape change, mouth openness or corner change, ear change, forehead crease change, chin position change, cheek shape change, face shadow change for example. When a facial image of the user is captured, the sender terminal 101 may identify the current emotional state of the user by comparing the captured facial image with the emotion classification database.

The emotion classification database supports identification of emotional states such as happiness, sadness, anger, surprise, fear and disgust, and may support more detailed emotion classification depending upon the level of detail of stored data. The sender terminal 101 may pre-store an emotion classification database or store the same received through the communication unit from the outside and may update the database at regular intervals or upon generation of new information for more accurate and detailed emotion analysis.

The receiver terminal 102 receives an emotion indicative image from the sender terminal 101 and outputs the received emotion indicative image. The receiver terminal 102 may perform image reception and update in response to transmission modes of the sender terminal 101. For example, during activation of the message function, in response to the sender terminal 101 capturing a facial image within a preset period and sending the captured image if an emotional state change is detected, the receiver terminal 102 may receive an emotion indicative image and output the emotion indicative image in response to the period. In response to the sender terminal 101 sending an emotion indicative image together with a message, the receiver terminal 102 may receive an emotion indicative image indicating an emotional state differing from the previous emotional state together with a message, or receive information indicating absence of emotional state change together with a message.

The receiver terminal 102 outputs an emotion indicative image on a message function support interface on the display unit. The receiver terminal 102 may output received emotion indicative images in response to different settings. For example, the receiver terminal 102 may configure a displayed image with a separate region to output emotion indicative images of users using the message function, and output emotion indicative images of current users in the separately configured region. The receiver terminal 102 may arrange a region for user related images on a message output screen outputting exchanged messages, and output emotion indicative images of current users in the configured region on the message output screen.

The communication system 300 is configured to support data exchange between the sender terminal 101 and the receiver terminal 102. In particular, when at least one of the sender terminal 101 or the receiver terminal 102 is a mobile communication device, the communication system 300 may include network entities, such as a base station, a base station controller and a mobile switching center, supporting mobile communication. When the terminals are capable of Internet access, the communication system 300 may include a radio access network supporting Internet connection. In addition, the communication system 300 may include 2G, 3G and 4G network entities to support various communication schemes for the terminals.

The communication system 300 may support message exchange between the sender terminal 101 and the receiver terminal 102. In particular, the communication system 300 may support instant messaging (IM) between the terminals 101 and 102. To support instant messaging, an instant message server apparatus may be attached to the communication system 300. The terminals 101 and 102 may execute a message support program provided by the instant message server apparatus and connect to the instant message server apparatus through the communication system 300 to execute a message function advantageously based on face recognition using an instant message server apparatus. When instant messaging is performed through direct message exchange between the terminals 101 and 102, the instant message server apparatus may be omitted. As described above, the communication system 300 is not limited to a particular communication scheme or communication module, and may be understood as a method capable of relaying emotion indicative images and messages from the sender terminal 101 to the receiver terminal 102.

A typical terminal can act as a sender when sending a message to another terminal or act as a receiver when receiving a message from another terminal. Hence, in the following description, the sender terminal 101 and receiver terminal 102 are collectively described as a mobile terminal 100 that can serve as a sender or a receiver in response to context.

Figure 2:
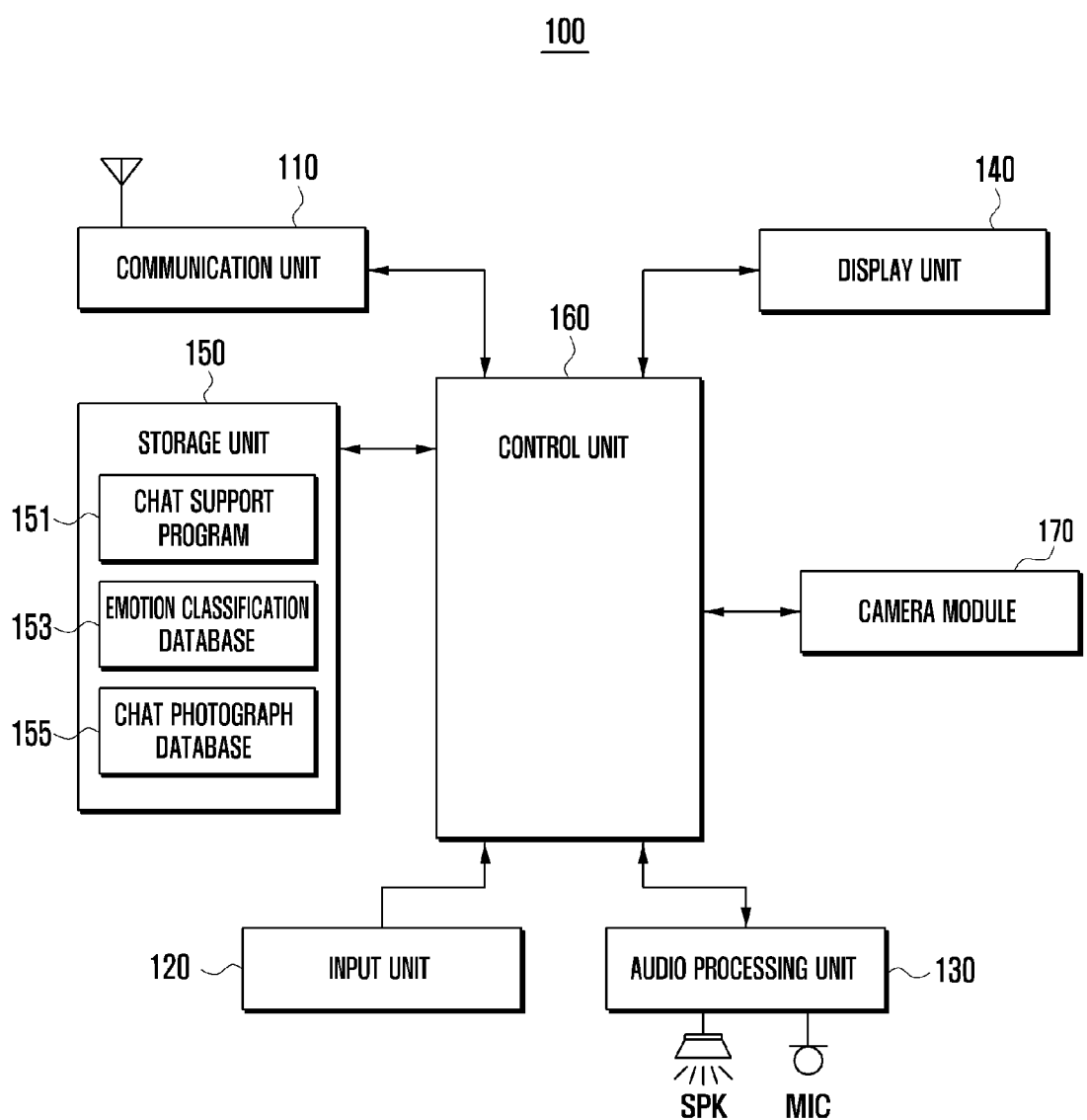
FIG. 2 shows a mobile terminal supporting a message function based on face recognition according to invention principles.

FIG. 2 shows mobile terminal 100 supporting a message function based on face recognition. The mobile terminal 100 may include a communication unit 110, an input unit 120, an audio processing unit 130, a display unit 140, a storage unit 150, a camera module 170, and a control unit 160. In response to activation of a message function, the mobile terminal 100 having the above configuration, activates the camera module 170 to capture a facial image, performs emotion analysis using the captured image, and sends an emotion indicative image to another mobile terminal. During emotion analysis, the mobile terminal 100 identifies an emotional state corresponding to the captured image from multiple different predetermined emotional states, and may send an emotion indicative image associated with the captured image in response to the identified emotional state being different from a previous emotional state and predetermined settings. That is, the mobile terminal 100 may send image data in response to detection of an emotional state change of a user, minimizing superfluous data transmission of emotion information.

When an emotion indicative image is received from another mobile terminal, the mobile terminal 100 may output the received emotion indicative image in a separately configured output region, such that emotional state change of the sending user may be readily identified. Alternatively, the mobile terminal 100 may output the received emotion indicative image in a message output region, so that an emotional state change in response to message exchange is readily identified.

To achieve this, the communication unit 110 is configured to support transmission of message and image data. The communication unit 110 may include at least one communication module to support at least one communication scheme. For example, the communication unit 110 may include a communication module supporting one of 2G, 3G and 4G mobile communication. The control unit 160 may activate the communication unit 110 in response to a user request to establish a communication channel compatible with a requested service type. Here, the communication unit 110 may establish a communication channel in response to an item activated by the user. For example, the communication unit 110 may support data transmission for instant messaging or for a message function based on face recognition in particular. For the message function supported by the communication unit 110, the control unit 160 may provide a message output screen containing emotion indicative images.

The input unit 120 is configured to generate different input signals needed for operation of the mobile terminal 100. The input unit 120 may include keys such as a button key, side key and home key, and further include a virtual touch pad supporting full touchscreen capabilities. Here, the virtual touch pad may be displayed on the display unit 140 and generate an input signal in response to a user touch. In particular, the input unit 120 may generate an input signal for activation of a video chat mode, in which a user function based on face recognition is enabled, in response to a user request. The input unit 120 may generate an input signal for deactivating the video chat mode in response to a user request. In response to the video chat mode being deactivated, a regular message function may be performed to exchange messages without separate image transmission. During the video chat mode, the input unit 120 may generate an input signal for selection of one of different options for operating the camera module 170. For example, the options for operating the camera module 170 may include: operating the camera module 170 in response to a preset period, operating the camera module 170 when a message is entered or sent, operating the camera module 170 when a message is received, and operating in response to a combination of the above options.

An input signal generated by the input unit 120 is sent to the control unit 160, which performs a function in response to the input signal. When the display unit 140 supports an input function, the display unit 140 may act as an input means. In this case, the display unit 140 having a touch capability may be used to generate an input signal for toggling between a message function based on face recognition and a regular message function. The audio processing unit 130 is configured to process different audio signals generated in the course of operating the mobile terminal 100. The audio processing unit 130 may include a speaker SPK to output a generated audio signal, and a microphone MIC to collect an audio signal for a voice or video call and recording. When a voice message function is supported, the audio processing unit 130 may collect a voice signal from the user and forward the voice signal to the control unit 160.

The audio processing unit 130 may output a sound notification indicating activation of the video chat mode, a sound notification indicating image capture by the camera module 170 during the video chat mode, and a sound notification indicating reception of a new emotion indicative image from another mobile terminal. Output of a sound notification indicating image capture by the camera module 170 may be skipped or performed within a few seconds from initiation of camera image capture in response to user settings.

The display unit 140 is configured to output different function screens needed for operation of the mobile terminal 100. For example, the display unit 140 may output a variety of screens such as a menu screen, icon screen, widget screen, idle screen, and lock screen in response to settings and functions supported by the mobile terminal 100. In particular, the display unit 140 may output a message function screen in response to a user request, and output a video chat screen in response to selection of the video chat mode. GUI (graphical user interface) screens for the video chat mode are described in more detail later with reference to the drawings.

The storage unit 150 is configured to store a variety of programs and data needed for operation of the mobile terminal 100. For example, the storage unit 150 may store an operating system for controlling operation of the mobile terminal 100, and data sent, received or input in the course of operating the mobile terminal 100. In particular, to support the video chat mode of the present disclosure, the storage unit 150 may store a chat support program 151, an emotion classification database 153, and a chat photograph database 155.

The chat support program 151 may include different routines to support a chat function of the mobile terminal 100. For example, the chat support program 151 may include a routine for opening a chat room to chat with another user by use of a phone number or ID of a different mobile terminal, a routine for transmitting a message to the chat room, and a routine for recording and storing exchanged messages. In particular, to support the message function based on face recognition, the chat support program 151 may include a routine for activating the camera module 170 in response to occurrence of a preset event, a routine for capturing a facial image using the camera module 170, a routine for identifying an emotional state corresponding to the captured facial image, and a routine for controlling transmission of the captured image in response to the identified emotional state. Here, the routine for identifying an emotional state may include at least one of a routine for analyzing a preset image frame or a real-time preview image, a routine for analyzing an image stored in real time or a routine for analyzing an encoded image.

The emotion classification database 153 provides information on mappings between facial feature elements and emotional states such as happiness, sadness, anger, surprise, fear, and disgust. For example, the emotion classification database 153 may map different feature elements such as lip shapes, eye shapes, chin positions and forehead creases to the emotional states. The emotion classification database 153 may provide information on emotional states classified in more detail for a variety of facial feature elements, as necessary.

The chat photograph database 155 stores emotion indicative images exchanged during execution of the message function based on face recognition. In the chat photograph database 155, emotion indicative images may be grouped on a chat room basis. The chat photograph database 155 may temporarily buffer preview images and may store encoded images together with mappings to emotion indicative images. When an original image request for an emotion indicative image is received from another mobile terminal, the chat photograph database 155 may support transmission of an encoded original image to the requesting mobile terminal. The chat photograph database 155 may store representative emotion indicative images associated with a phone number or identifier of each mobile terminal in a chat room, and may store representative emotion indicative images of the mobile terminal 100. Representative emotion indicative images stored in the chat photograph database 155 may be used as a reference to determine whether the emotional state indicated by a newly captured image is the same as the previous emotional state.

The camera module 170 captures a facial image of the user and forwards the captured image to the control unit 160. The camera module 170 may be placed at the front of the mobile terminal 100 where the display unit 140 is arranged so as to capture a facial image of the user during execution of the message function. Upon activation under control of the control unit 160, the camera module 170 may capture a preview image and send the preview image to the control unit 160, or capture an image in real time and send the image thereto. For example, the camera module 170 may be activated to capture a facial image of the user at a predetermined rate during execution of the message function. If a facial image is not captured, the camera module 170 may be controlled to stop image capture and the message function based on face recognition may be temporarily stopped. The message function based on facial recognition may be resumed, after being temporarily stopped, in response to generation of an input event for terminal manipulation or message function operation. The control unit 160 is configured to control signal exchange, data processing, information collection and distribution of the mobile terminal 100 for video chat mode operation.

Figure 3:
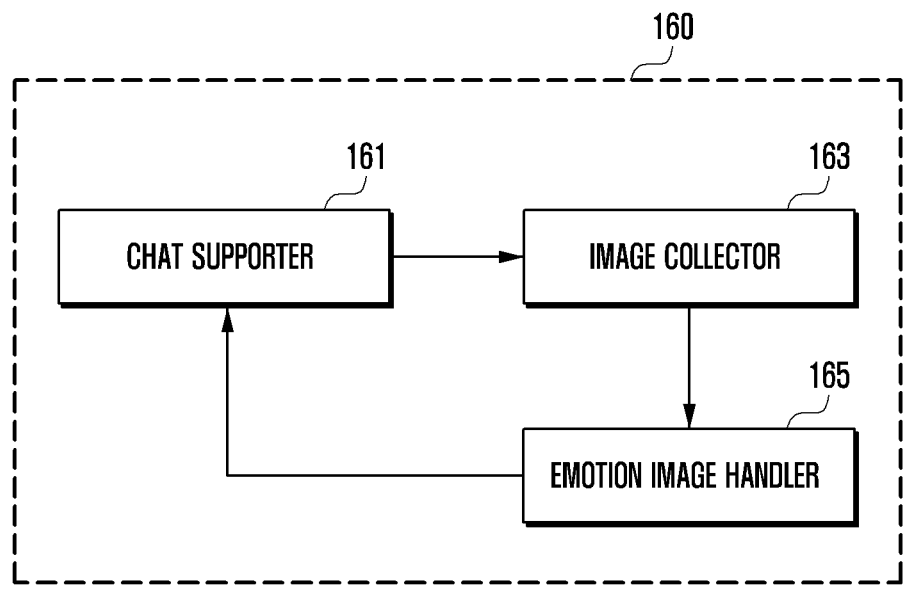
FIG. 3 shows a control unit of the mobile terminal in FIG. 2, according to invention principles.

The message function based on face recognition, the control unit 160 of the mobile terminal 100 may have a configuration as shown in FIG. 3. The control unit 160 may include a chat supporter 161, an image collector 163, and an emotion indicative image handler 165. The chat supporter 161 supports a basic chat function of the mobile terminal 100 by exchanging instant messages with another mobile terminal. The chat supporter 161 also supports a video chat mode associated with a message function based on face recognition and displays at least one of a video chat icon or a video chat menu icon as a GUI element for video chat mode selection on a message function screen or idle screen.

The chat supporter 161 supports storage and update of representative emotion indicative images. Specifically, in the event that a number of emotional states are defined by the emotion classification database 153, when an emotion indicative image corresponding to an emotional state is obtained, the chat supporter 161 may store the emotion indicative image as a representative emotion indicative image for the emotional state in the chat photograph database 155. When an emotional state corresponding to a representative emotion indicative image is detected, the chat supporter 161 may use the representative emotion indicative image as an image to be sent to another mobile terminal. The chat supporter 161 may update stored representative emotion indicative images at a predetermined frequency such as hourly, daily or weekly, or replace a stored representative emotion indicative image with a corresponding emotion indicative image in response to a user request at the time of image capture. In response to identification of an emotional state corresponding to a newly obtained image, the chat supporter 161 may check whether a stored emotion indicative image associated with the same emotional state is present and, if such an emotion indicative image is present, prompts a user to decide whether to send the stored emotion indicative image or the newly obtained emotion indicative image. Here, the chat supporter 161 may output the stored emotion indicative image and the newly obtained emotion indicative image together for easy comparison.

The chat supporter 161 supports browsing of a history of exchanged images and may provide an icon or menu item to view images sent to and received from other users in a chat room. Alternatively, the chat supporter 161 may arrange a region for emotion indicative images on the display unit 140 and support, when one of the emotion indicative images displayed in the region is selected, browsing of a history of all emotion indicative images of a user related to the selected emotion indicative image. The chat supporter 161 may output a history of emotion indicative images together with instant messages exchanged at the time of exchange of the emotion indicative images.

When an original image request for an emotion indicative image is received from another mobile terminal or the input unit 120, the chat supporter 161 may provide the requested original image. That is, when an original image request for an emotion indicative image is received from another mobile terminal, the chat supporter 161 may send a stored original emotion indicative image to the requesting mobile terminal. When an original image request for an emotion indicative image is received from the input unit 120, the chat supporter 161 may output a stored original image of the emotion indicative image on the display unit 140. When an emotion indicative image is associated with a preview image, the chat supporter 161 may encode and store a buffered original image and chat supporter 161 may sustain a buffered preview image associated with an emotion indicative image for a predetermined time.

The image collector 163 activates the camera module 170 for image capture in response to activation of the message function based on face recognition. In particular, the image collector 163 may support image capture in response to generation of a predetermined event. Here, the predetermined event may be triggered at regular intervals when the video chat mode is activated to execute the message function based on face recognition. In the video chat mode, the predetermined event may correspond to at least one of an input event for message composition, an input event for message transmission, an input event for reading or replying to a received message, or activation of a messaging application. During the video chat mode, the image collector 163 may provide at least one of a captured preview image or image stored in real time to the emotion indicative image handler 165 in response to configuration, settings or design of the mobile terminal 100.

The image collector 163 may provide an image capture notification at the time of capturing a facial image for emotion indicative image generation. For example, the image collector 163 may output at least one of a sound notification indicating image capture, light flickering of a predetermined pattern, or vibration of a predetermined pattern. When the face of the user is not captured by the camera module 170 during the video chat mode, the image collector 163 may regard the user as being absent and respond accordingly. For example, the image collector 163 may send a predetermined image or message indicating absence.

The emotion indicative image handler 165 performs emotion analysis using a facial image provided by the image collector 163 and the emotion classification database 153 and generates an emotion indicative image. Specifically, the emotion indicative image handler 165 identifies an emotional state corresponding to the facial image among a number of classified emotional states and generates an emotion indicative image corresponding to the identified emotional state. The emotion indicative image handler 165 may provide the emotion indicative image together with information on the identified emotional state to another mobile terminal. When the identified emotional state is the same as that indicated by the previously obtained image, the emotion indicative image handler 165 may indicate lack of change in emotional state. In this case, the emotion indicative image handler 165 may skip transmission of the emotion indicative image by default or may request the user to decide whether to send the emotion indicative image and send the emotion indicative image in response to the user decision.

Figure 4:
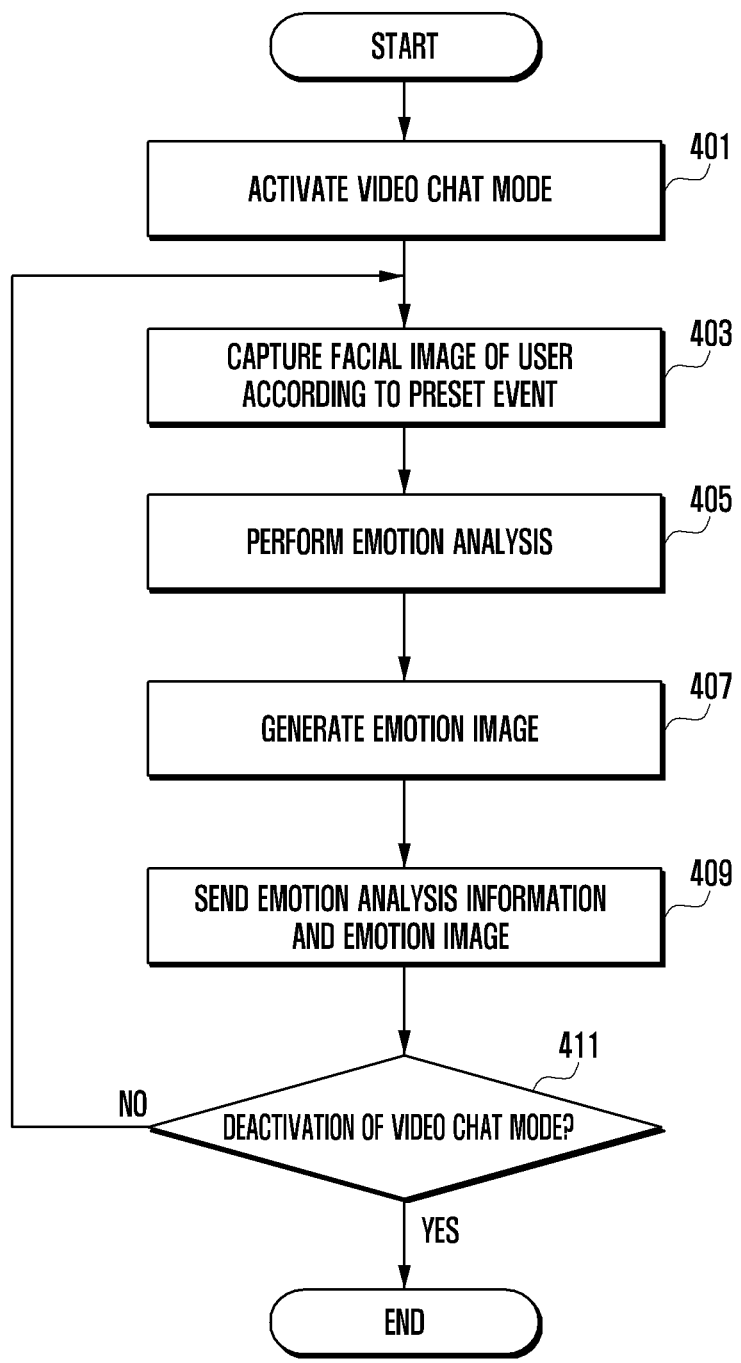
FIG. 4 shows a flowchart of a method for supporting a video chat mode according to invention principles.

FIG. 4 shows a flowchart of a method for supporting a video chat mode. At operation 401, the control unit 160 of the mobile terminal 100 activates the video chat mode in response to an input event or predetermined schedule information and may output an icon or menu item for video chat mode selection. At operation 403, the control unit 160 captures a facial image of the user in response to generation of a predetermined event. That is, the control unit 160 may activate the camera module 170 when at least one of an input signal for activating basic video chat mode operations such as time period setting, an input signal for message composition, or an input signal for message transmission is generated. The control unit 160 may obtain a preview image provided by the camera module 170 in real time or may control the camera module 170 to capture a facial image of the user at a predetermined time.

In response to obtaining a facial image, at operation 405, the control unit 160 performs emotion analysis using the facial image. The control unit 160 may identify an emotional state corresponding to the facial image using the emotion classification database 153. In particular, the control unit 160 may perform emotion analysis using a currently buffered image when a captured image is used or preview images indicate absence of motion for a predetermined time. The control unit 160 may perform emotion analysis using a preview image taken at the generation time of an input event for a message composition completion or a preview image taken at the generation time of an input event for message transmission.

In response to emotion analysis, at operation 407, the control unit 160 generates an emotion indicative image. Specifically, the control unit 160 may demarcate a region containing the face of the user in the preview image or captured image used for emotion analysis and extract the demarcated region as an emotion indicative image. The control unit 160 may insert a textual description indicating the corresponding emotional state into the emotion indicative image. Alternatively, the control unit 160 may retrieve a representative emotion indicative image corresponding to the identified emotional state from the emotion classification database 153 and use the representative emotion indicative image as an emotion indicative image. In the event that the emotion analysis result is equal to the previous one, the control unit 160 may skip operation 407 (emotion indicative image generation) and operation 409 (emotion indicative image transmission) and may send a message indicating absence of emotional state change to another mobile terminal without separate image transmission in response to settings. The control unit 160 returns to operation 403 and continues video chat mode operation.

At operation 409, the control unit 160 sends the emotion analysis information and the emotion indicative image. Here, the emotion analysis information and the emotion indicative image may be sent together with a message or may be sent immediately after emotion analysis using a captured image. Hence, the mobile terminal 100 may send emotion analysis information and an emotion indicative image to another mobile terminal automatically when a message is not entered. When representative emotion indicative images are used for video chat mode operation and a counterpart mobile terminal pre-stores the representative emotion indicative images of the user, emotion analysis information without an emotion indicative image is sent to the counterpart mobile terminal, which may then output a pre-stored representative emotion indicative image of the sending user corresponding to the received emotion analysis information on the display unit. When a representative emotion indicative image is updated with a new representative emotion indicative image in response to a predetermined period, the control unit 160 may send the new representative emotion indicative image and associated emotion analysis information to the counterpart mobile terminal. The control unit 160 may maintain information on representative emotion indicative images sent to a counterpart mobile terminal as a history of representative emotion indicative images and the control unit 160 may attach version information to existing and new representative emotion indicative images. At operation 411, the control unit 160 checks whether an input event for deactivating the video chat mode is generated, and if not, the control unit 160 returns to operation 403 and continues video chat mode operation.

Figure 5:
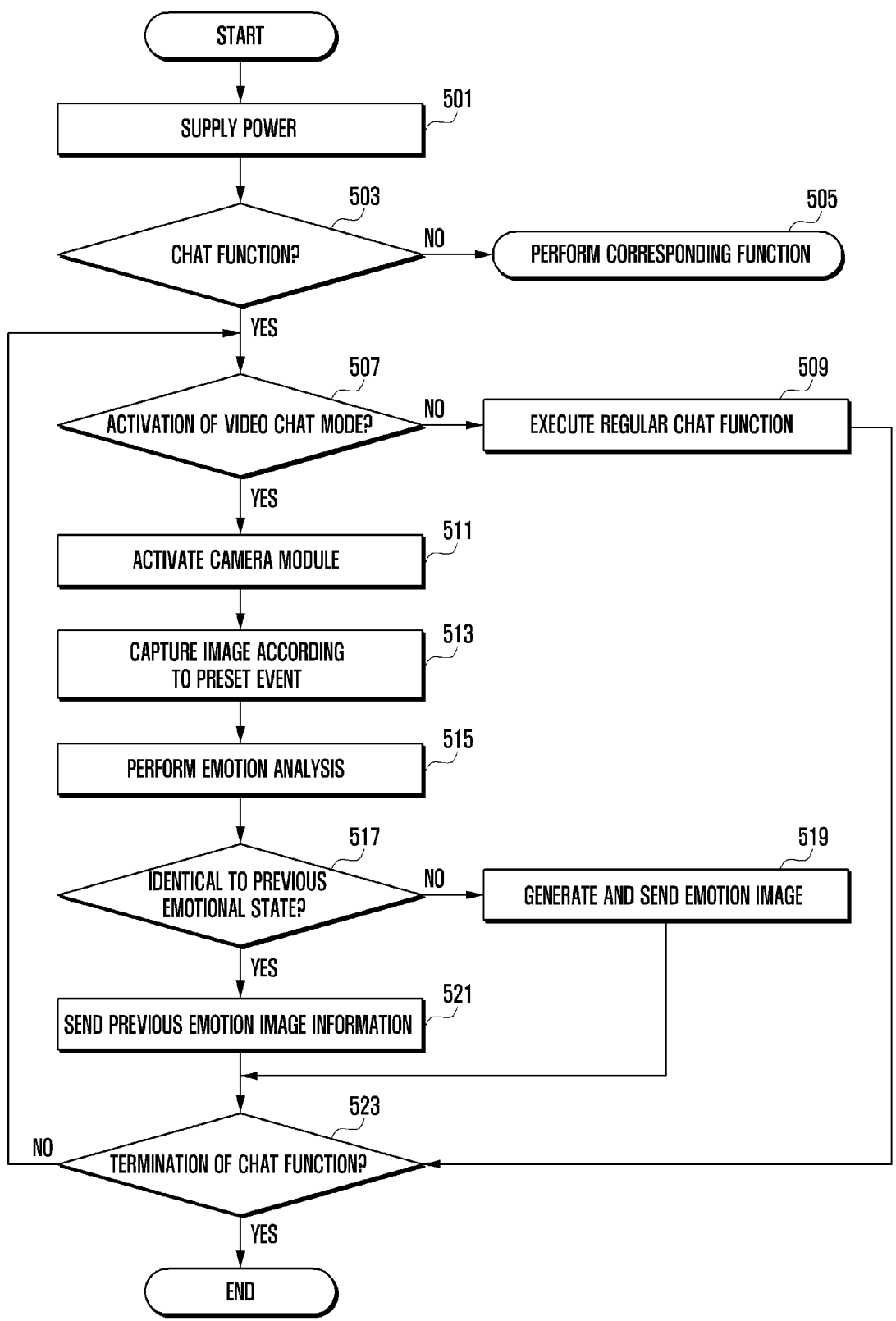
FIG. 5 shows a flowchart of another method for supporting a video chat mode according to invention principles.

FIG. 5 shows a flowchart of another method for supporting a video chat mode. At operation 501, the control unit 160 controls supply of power to individual components of the mobile terminal 100 and may output a menu or icon for selecting the video chat mode. Upon generation of an input event, at operation 503, the control unit 160 checks whether the input event is related to selection of a chat function and if not, the control unit 160 proceeds to operation 505 at which the control unit 160 performs a function corresponding to the input event. For example, the control unit 160 may perform one of different functions such as a call function, broadcast reception, file editing, file playback, a memo function, a note function, and a camera function in response to the input event.

If the input event is related to selection of a chat function, the control unit 160 proceeds to operation 507 at which the control unit 160 checks whether an input event for activating a video chat mode is generated and if not, the control unit 160 proceeds to operation 509 at which the control unit 160 executes a regular chat function. For example, the control unit 160 may control transmission and reception of text-based instant messages. If an input event for activating a video chat mode is generated at operation 507, the control unit 160 proceeds to operation 511 at which the control unit 160 activates the camera module 170. At operation 513, the control unit 160 controls the camera module 170 to capture an image in response to predetermined settings. In particular, the control unit 160 may control the camera module 170 to capture a facial image of the user. At operation 515, the control unit 160 performs emotion analysis using the captured image. The control unit 160 may identify an emotional state of the user corresponding to the captured image on the basis of information stored in the emotion classification database 153. Specifically unit 160 identifies features e.g. lips, cheeks by edge detection determining transition in pixel luminance along a feature boundary, for example, as known. Unit 160 transforms the identified image features using translation, scaling and rotation operations for comparison with predetermined stored image features associated with particular emotions in mapping information (e.g. upward curving lips represents a smile and happiness). Unit 160 compares the identified transformed features with predetermined stored mage features using the mapping information and identifies an emotion and an associated emotion indicative image.

At operation 517, the control unit 160 checks whether the identified emotional state (current emotional state) is identical to an emotional state corresponding to the previously captured image (previous emotional state). If the current emotional state is different from the previous one, the control unit 160 in operation 519 generates an emotion indicative image and sends the emotion indicative image. The control unit 160 may separately store the original image corresponding to the emotion indicative image in the storage unit 150, and may adjust resolution of the emotion indicative image during generation of the emotion indicative image using the original image. For example, the control unit 160 may set the resolution of the emotion indicative image to a tenth of the resolution of the original image and resize the emotion indicative image in response to predetermined settings.

If the current emotional state is identical to the previous one, the control unit 160 at operation 521 sends information concerning the previous emotion indicative image such as emotion indicative image index information indicating no change in the emotion indicative image, for example. At operation 523, the control unit 160 checks whether an input event for deactivating the chat function is generated and if not, the control unit 160 returns to operation 507 and continues the chat function.

Figure 6:
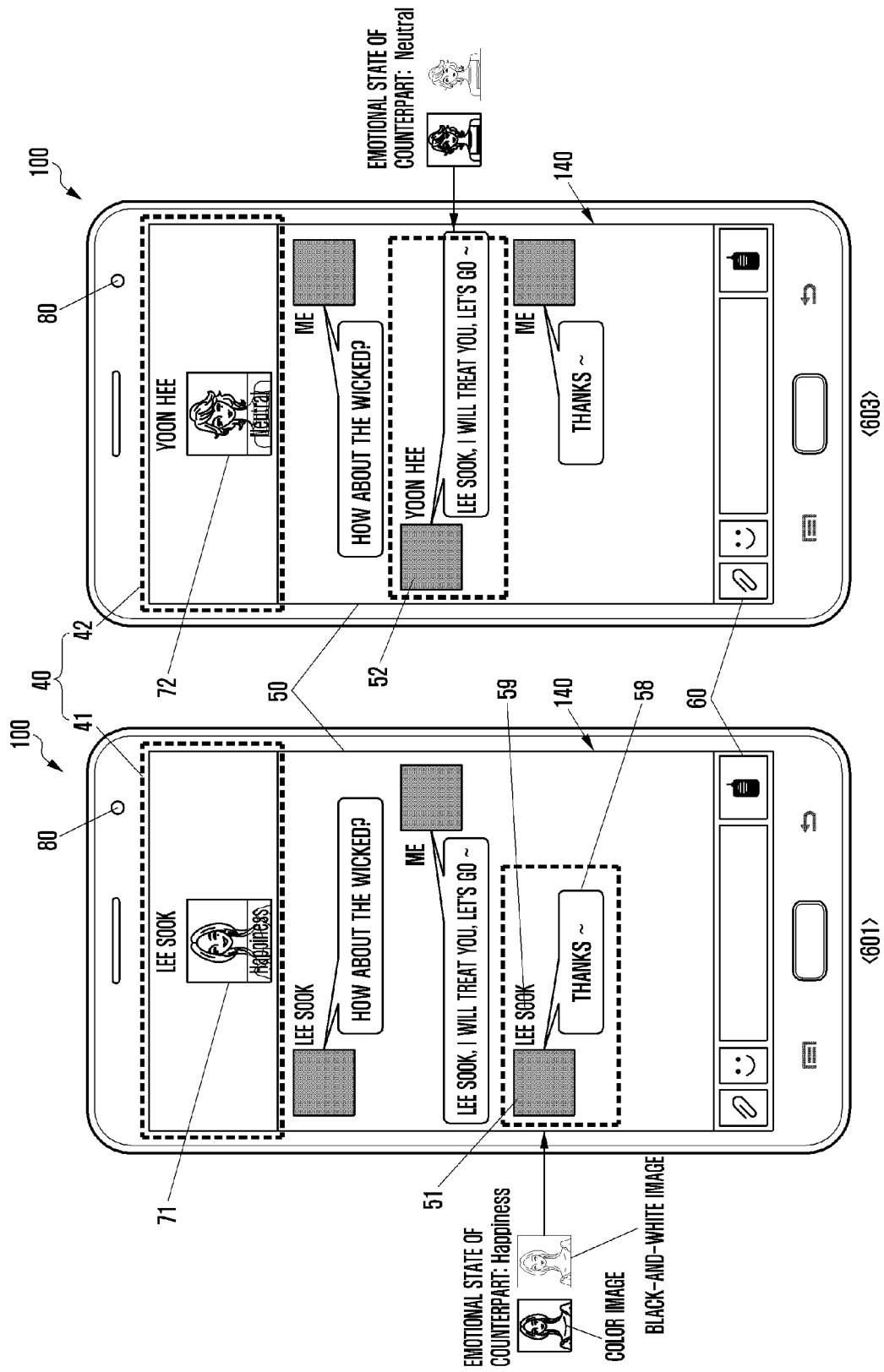
FIG. 6 shows a screen interface of the mobile terminal according to invention principles.

FIG. 6 shows a screen interface of the mobile terminal. The mobile terminal 100 may output a chat message region 50, an emotion indicative image region 40 and an input region 60 on the display unit 140. The chat message region 50 is used to output messages exchanged with another mobile terminal. In the chat message region 50, a text region 58 for message text and an image region 51 or 52 for user identification may be output. Identification information 59 for user distinction may be output close to the image region 51 or 52. Identifiers "Yoon Hee", "Lee Sook" and "Me" (user of each mobile terminal) may correspond to the identification information 59. Image 601 indicates the screen of a mobile terminal used by a user "Yoon Hee", and image 603 indicates the screen of a mobile terminal used by a user "Lee Sook".

As indicated by image 601, a first emotion indicative image 71 of "Lee Sook" may be output in a first emotion indicative image region 41 on the display unit of the terminal of "Yoon Hee". As described before, the first emotion indicative image 71 may be updated when an emotional state change is detected through emotional analysis based on a facial image of "Lee Sook". In response to settings, the facial image of "Lee Sook" may be updated in real time or at regular intervals when an emotional state change is detected or not detected. The first emotion indicative image 71 may be composed of an emotion indicative image and textual emotional state information such as "Happiness" or "Neutral". As an emotion indicative image may be output in the image region 51 or 52, the mobile terminal 100 may set the emotion indicative image size to the size of a thumbnail usable in instant messaging at the time of emotion indicative image generation.

The first emotion indicative image 71 of "Lee Sook" may be output not only in the first emotion indicative image region 41 but also in a first image region 51 of "Lee Sook". When the first emotion indicative image 71 is updated, the first emotion indicative image in the first image region 51 may also be updated. Here, a newly received first emotion indicative image may be output only in a first image region 51 corresponding to a newly received message. For example, in a state indicated by image 601, a new first emotion indicative image of "Lee Sook" may be output in a first image region 51 of the most recently received message from "Lee Sook", and a previously received first emotion indicative image may be output in a first image region of a previously received message.

As indicated by image 603, a second emotion indicative image 72 sent by "Yoon Hee" may be output in a second emotion indicative image region 42. The second emotion indicative image 72 may also be output in a second image region 52 related to "Yoon Hee" in the chat message region 50. Emotion indicative images of the users may be output in the image region of "Yoon Hee" named as "Me" as indicated by image 601 and be output in the image region of "Lee Sook" named as "Me" as indicated by image 603. That is, in a state indicated by image 601, a second emotion indicative image obtained through face recognition of "Yoon Hee" may be output in the image region of "Yoon Hee"; and, in a state indicated by image 603, a first emotion indicative image obtained through face recognition of "Lee Sook" may be output in the image region of "Lee Sook". The emotion indicative images may be output as at least one of a color image, a black-and-white image or a special effect image.

The mobile terminal 100 may indicate operation of the camera module 170. For example, to indicate operation of the camera module 170 for image capture, the mobile terminal 100 may change the color or flickering pattern of a lamp 80 placed at an upper right portion. Alternatively, the mobile terminal 100 may produce a highlight or flickering effect on the whole of the display unit 140, output a message popup, or generate a vibration of a given pattern to indicate operation of the camera module 170 for capturing a facial image to be used for emotion indicative image transmission. The camera module 170 may be arranged at almost the same portion as the lamp 80. The lamp may be arranged close to the lens of the camera module 170 and perform different lighting control operations for notification as previously described. The operation of the lamp 80 may be suspended when the camera module 170 performs image capture. The lamp 80 may also provide light needed by the camera module 170 for image capture.

Figure 7:
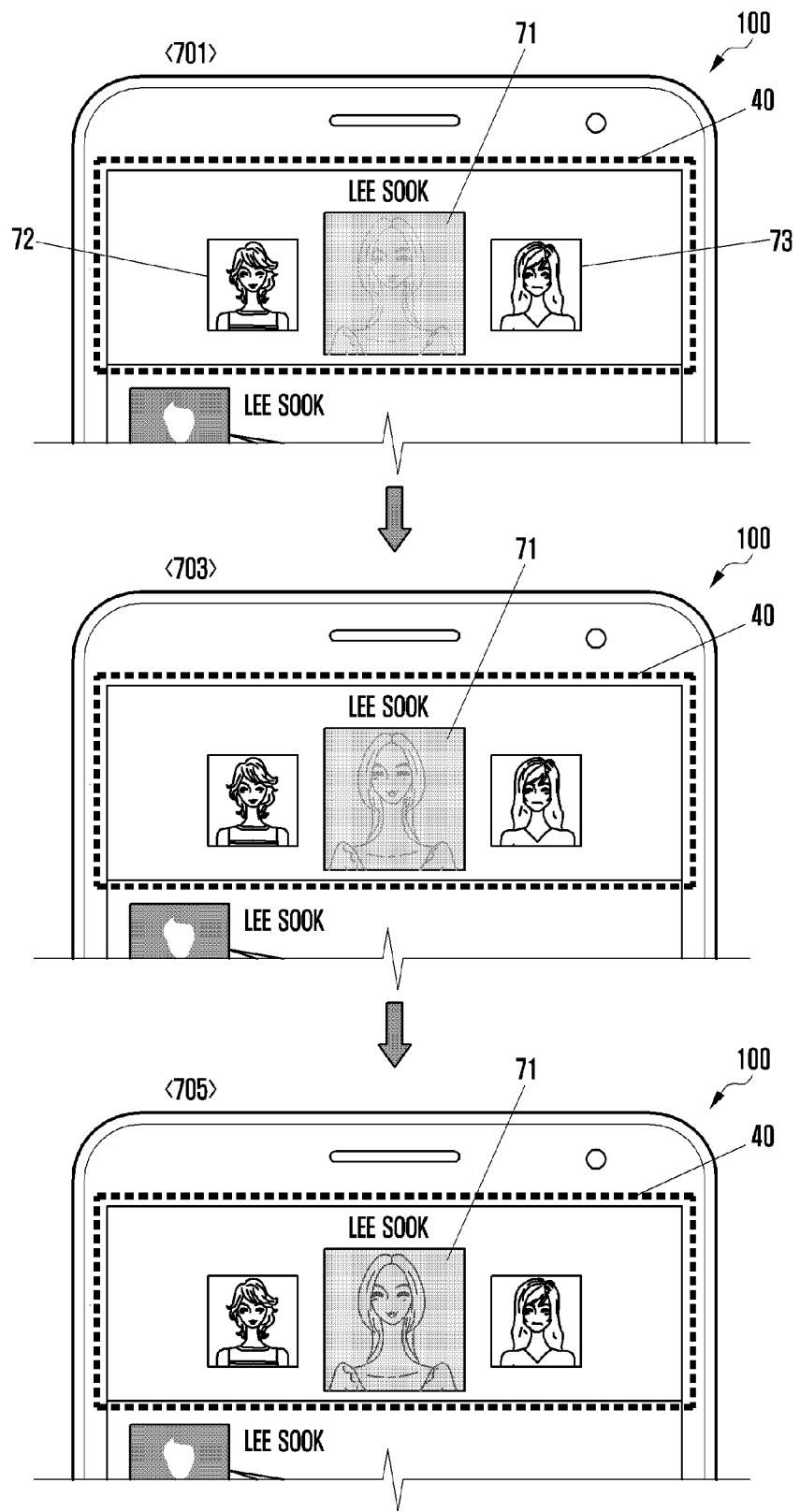
FIG. 7 and FIG. 8 show output of facial emotion images according to invention principles.
Figure 8:
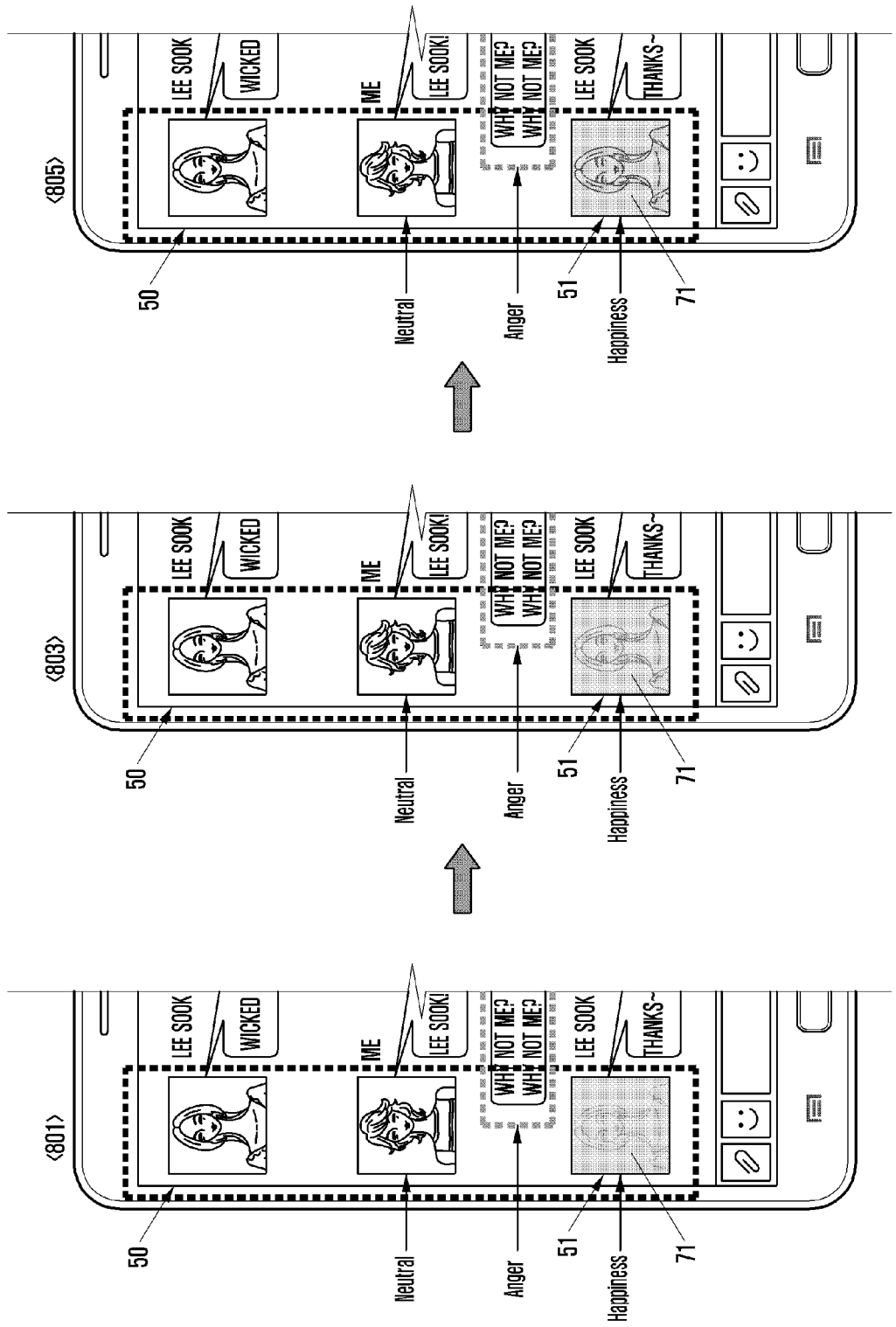

FIGS. 7 and 8 illustrate output of facial emotion indicative images. The mobile terminal 100 may output emotion indicative images of all users in a chat group in the emotion indicative image region 40. For example, when three users belong to a chat group, first to third emotion indicative images 71, 72 and 73 may be output in the emotion indicative image region 40. In order to update the first emotion indicative image 71 of "Lee Sook", the screen state may be gradually changed as indicated by image 801, 803, 805. A fade-in effect is used in FIG. 7. During update of the first emotion indicative image 71, the previous emotion indicative image is changed with a fade-out effect. In response to an update request for the first emotion indicative image 71, the previous emotion indicative image may be removed with a fade-out effect and a new emotion indicative image may be output with a fade-in effect.

The output of an emotion indicative image is not limited to use fade-in/out effects, and may be performed in different ways. That is, a previous emotion indicative image may be partially removed from the emotion indicative image region and a new emotion indicative image may be partially output in the emotion indicative image region, for example. A previous emotion indicative image may be moved in a direction for removal from the emotion indicative image region, and a new emotion indicative image may be output in a space arranged by movement of the previous emotion indicative image.

FIG. 8 shows update of an emotion indicative image output in the first image region 51 on the chat message region 50. In order to update the first emotion indicative image 71 of "Lee Sook" output in the first image region 51, the screen state may be gradually changed as indicated by image 801 to 805. Hence, one user may readily recognize an emotional state change of another user through a change in the image region on the chat message region 50. A previous emotion indicative image is output in the image region corresponding to the previously received message, and a new emotion indicative image is output in the image region corresponding to a newly received message.

Figure 9:
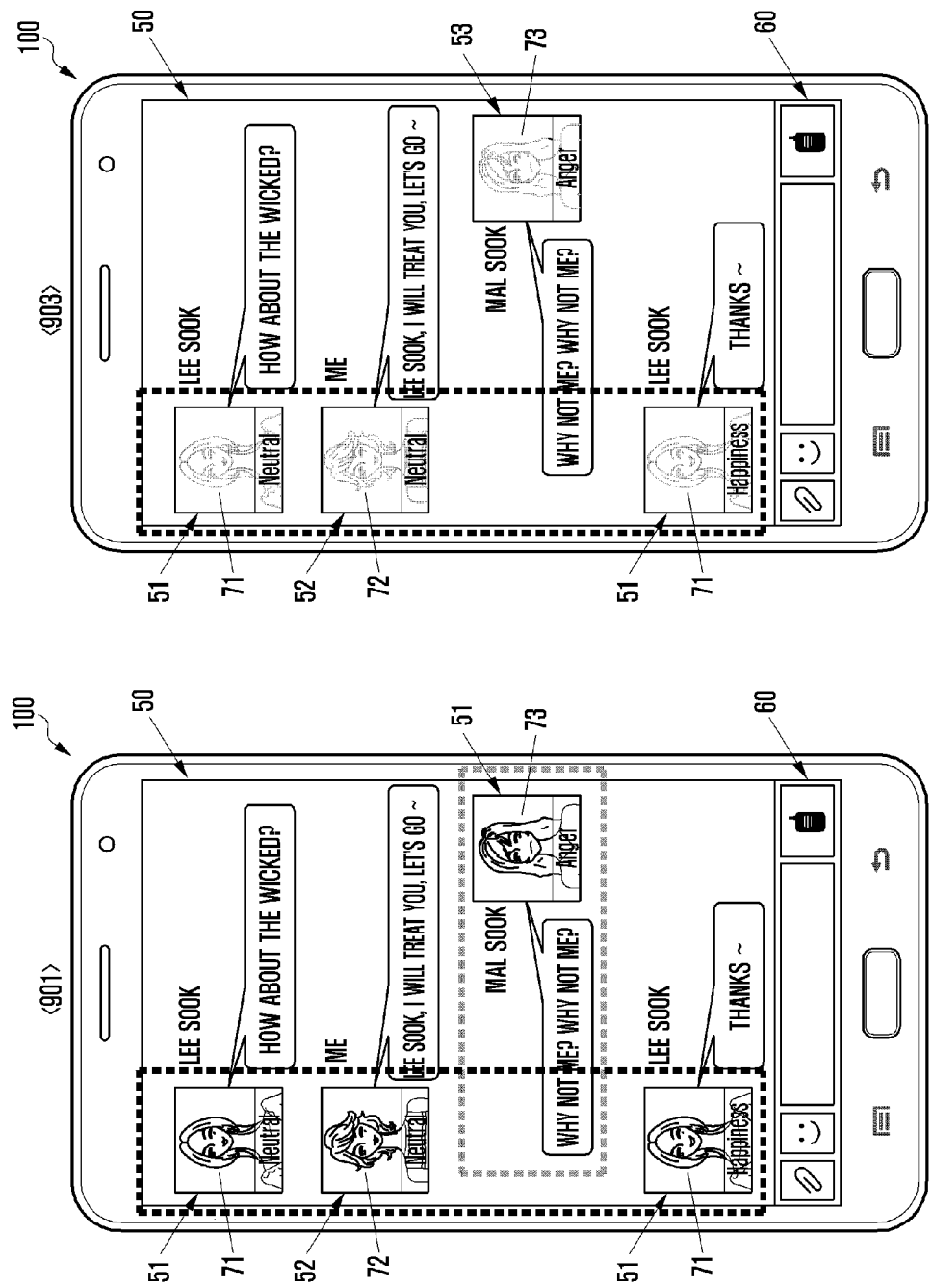
FIG. 9 shows visual effects applied to display of facial emotion images according to invention principles.

FIG. 9 shows visual effects applied to display of facial emotion indicative images. The mobile terminal 100 may output only a chat message region 50 and an input region 60 on the display unit 140 without a separate emotion indicative image region 40. The mobile terminal 100 may output emotion indicative images 71, 72 and 73 in the image regions 51, 52 and 53. Here, the emotion indicative images 71, 72 and 73 may be output as a color image as indicated by image 901 or as a black-and-white image as indicated by image 903. To this end, the mobile terminal 100 may provide a menu item for setting one of a color image and a black-and-white image, and output the emotion indicative images 71, 72 and 73 as a color image or a black-and-white image in response to settings in the menu item. In addition, emotional state information such as neutral, anger and happiness may be attached to the emotion indicative images 71, 72 and 73, such that emotional states of users may be readily identified.

The mobile terminal 100 may selectively use color or black-and-white images to output emotion indicative images. More specifically, for each user, the mobile terminal 100 may output an emotion indicative image associated with the most recently sent or received message as a color image and output an emotion indicative image associated with a previously sent or received message as a black-and-white image. Alternatively, for all users collectively, the mobile terminal 100 may output only an emotion indicative image associated with the most recently sent or received message as a color image and output emotion indicative images associated with previously sent or received messages as a black-and-white image. In this case, one color emotion indicative image and one or more black-and-white emotion indicative images may be output on the display unit 140. When a new message is received, the color emotion indicative image may be changed into a black-and-white emotion indicative image.

Figure 10:
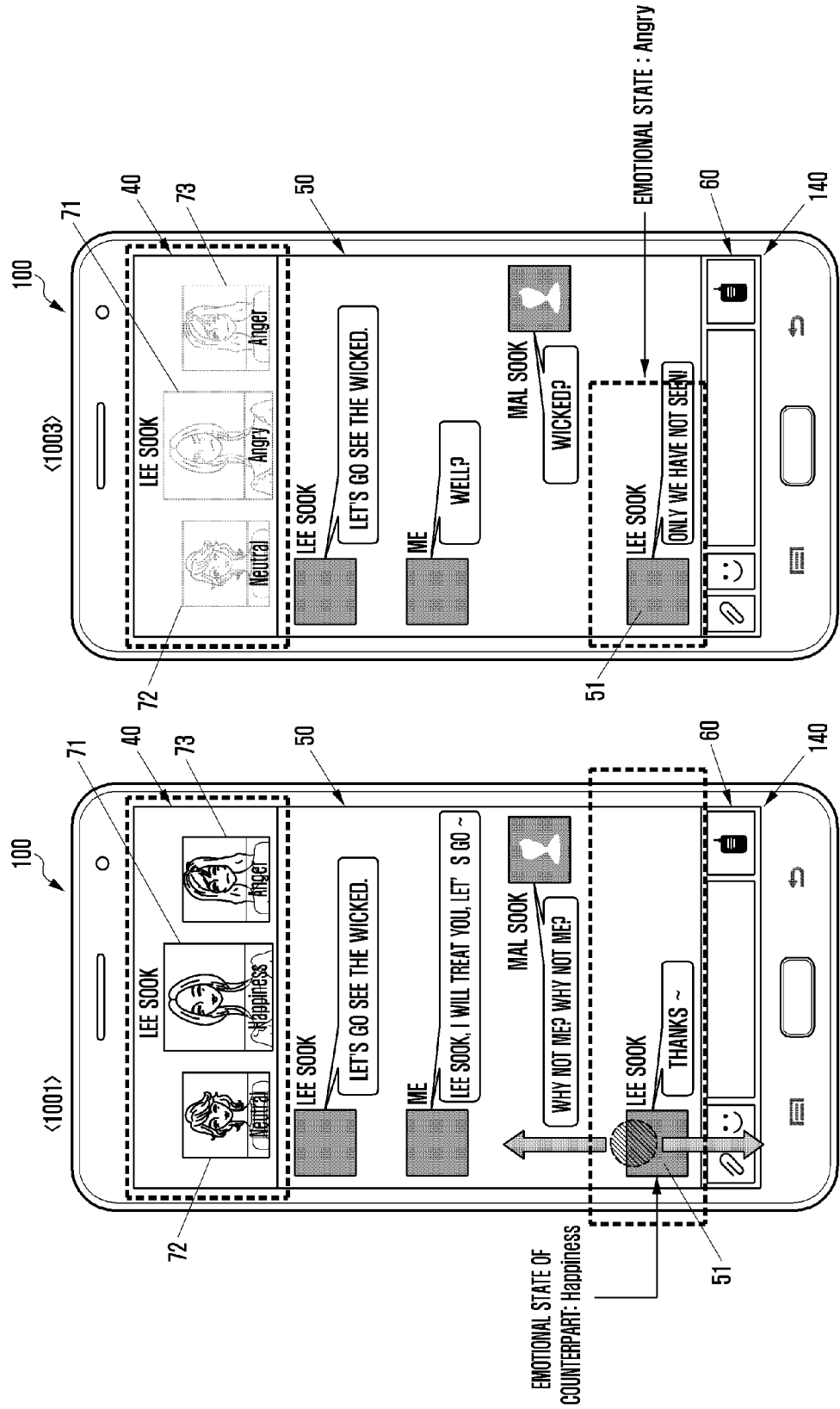
FIG. 10 shows browsing of previous emotion images according to invention principles.

FIG. 10 illustrates browsing of previous emotion indicative images. The mobile terminal 100 may output an emotion indicative image region 40, a chat message region 50 and an input region 60 as indicated by image 1001. Emotion indicative images 71, 72 and 73 of users in a chat group may be output in the emotion indicative image region 40. In particular, among the output emotion indicative images, the emotion indicative image of a user associated with the most recently sent or received message may be larger than the others. For example, the emotion indicative image of "Lee Sook", who has sent the most recent message, may be displayed as being larger than the others. The emotion indicative image of "Lee Sook" may also be moved to the central portion of the emotion indicative image region 40.

Multiple sent or received messages may be output in the chat message region 50. When the user scrolls the screen to browse previously sent or received messages, emotion indicative images 71, 72 and 73 output in the emotion indicative image region 40 may be changed in response to scrolling of messages output in the chat message region 50. In particular, among the emotion indicative images output in the message region 50, the emotion indicative image associated with a message specified by the user as indicated by image 1001 may be changed as indicated by image 1003. For example, upon generation of an input event on a first emotion indicative image region 51 of a message of "Lee Sook" selected as indicated by image 1001, the emotion indicative image of "Lee Sook" in the emotion indicative image region 40 is specified. When a previous message related to "Lee Sook" is output at a lower portion of the screen in response to screen scroll, an emotion indicative image associated with the previous message may be output in the emotion indicative image region 40. A thumbnail image of the specified user may be displayed in the first emotion indicative image region 51. Alternatively, an emotion indicative image may be displayed in the first emotion indicative image region 51 in response to predetermined settings.

Figure 11:
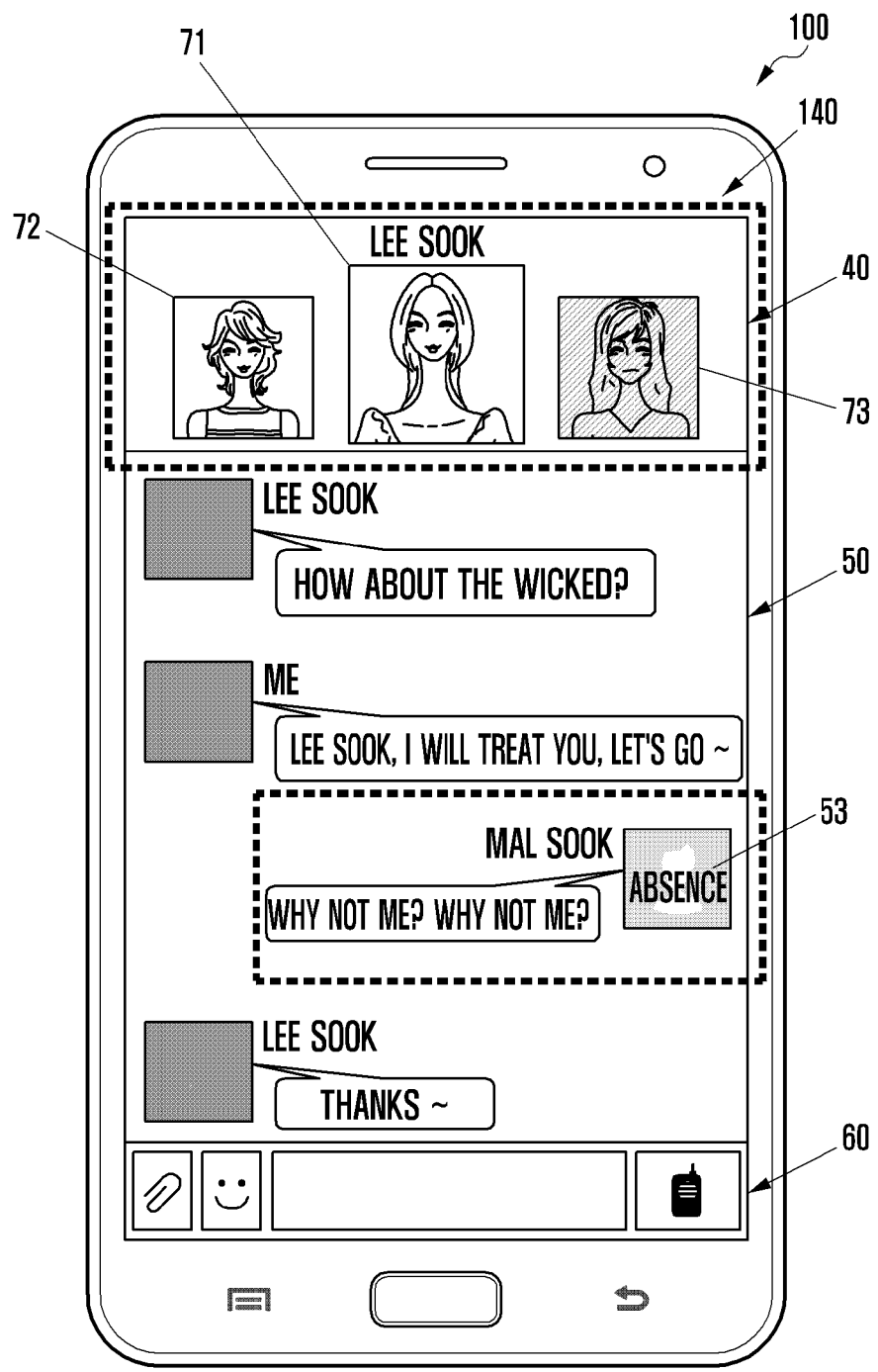
FIG. 11 shows handling of user absence in a video chat session according to invention principles.

FIG. 11 illustrates handling of user absence in a video chat session. The mobile terminal 100 may output an emotion indicative image region 40, a chat message region 50 and an input region 60 on the display unit 140 in response to activation of the video chat mode. The mobile terminal 100 may receive emotion indicative images from other users and output emotion indicative images 71, 72 and 73 of users in the emotion indicative image region 40. The mobile terminal 100 may output emotion indicative images received from other users in the emotion indicative image region 40 except for the emotion indicative image of the user of unit 100 in response to predetermined settings. The mobile terminal 100 may receive a message indicating face recognition failure from another mobile terminal. For example, during a video chat session, one user may leave a mobile terminal in an unused or turn-off state and the mobile terminal may send a message indicating user absence to other users in the chat group.

When a message indicating user absence is received from another mobile terminal, the mobile terminal 100 may reflect this in the emotion indicative image region 40 as shown in FIG. 11. For example, the third emotion indicative image 73 is shaded to indicate absence of the corresponding user. Alternatively, the mobile terminal 100 may attach a textual description indicating "user absence" to a portion overlapping with or close to an emotion indicative image of the absentee user. The mobile terminal 100 may output a visual effect or textual description indicating "user absence" in the image region in which a corresponding emotion indicative image may be output. For example, to represent absence of one user, the mobile terminal 100 may shade the third emotion indicative image 73 output in the third image region 53 associated with a message from "Mal Sook" or output a textual description indicating "user absence" in the third image region 53.

Figure 12:
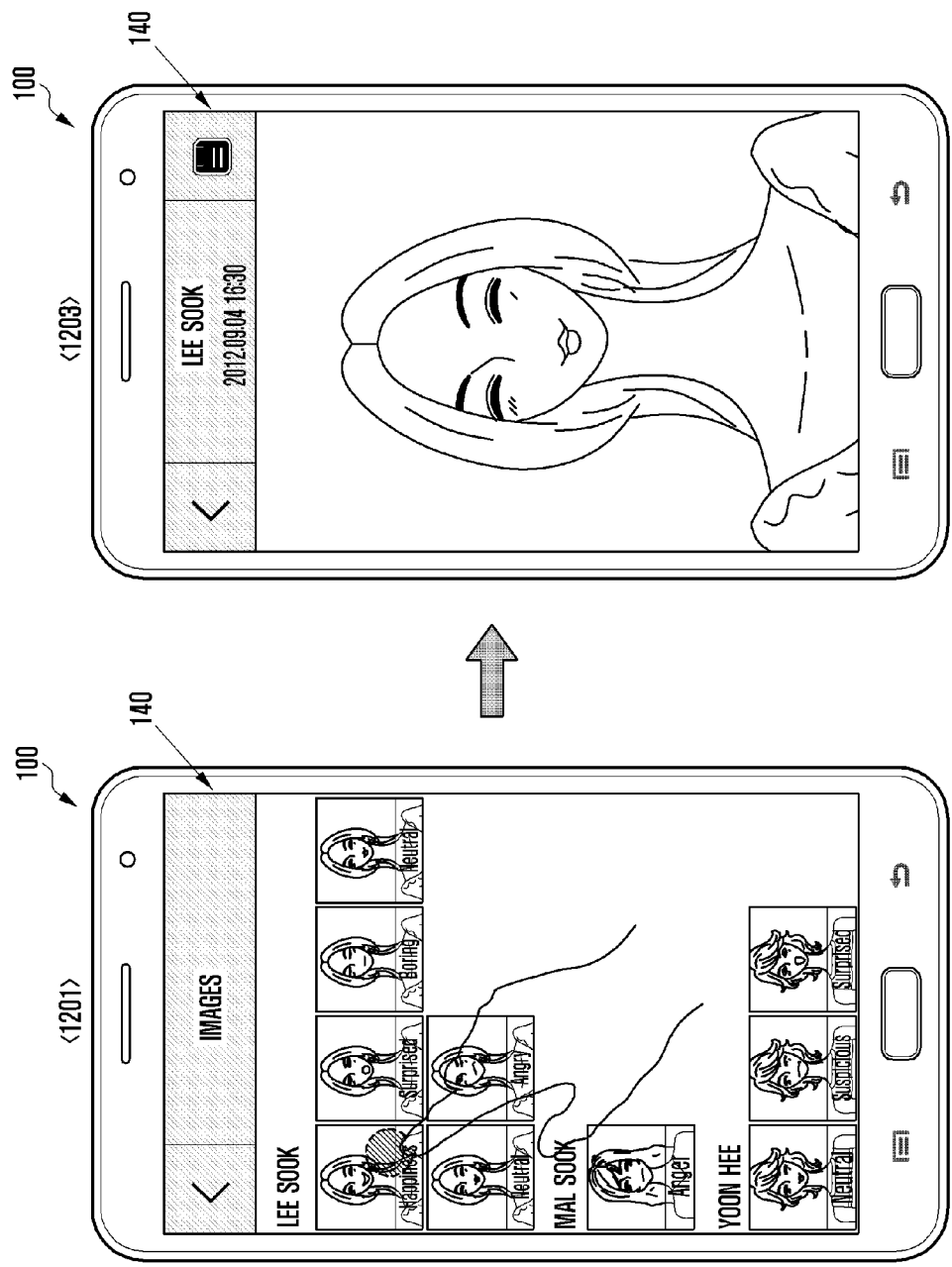
FIG. 12 shows browsing of a record of emotion indicative images according to invention principles.

FIG. 12 illustrates browsing of a record of emotion indicative images. The mobile terminal 100 may output emotion indicative images of users in one chat group in response to generation of an input event as indicated by image 1201. Here, the mobile terminal 100 may output emotion indicative images on a per user basis. Emotion indicative images are grouped by user and output on a per user basis for a chat group consisting of users "Lee Sook", "Mal Sook" and "Yoon Hee". Emotional state information may be written in each emotion indicative image. The mobile terminal 100 may provide a menu item to output lists of emotion indicative images for users, and may output, upon selection of the menu item, lists of emotion indicative images as indicated by image 1201.

Browsing of records of emotion indicative images may be performed in different intervals of time. For example, the mobile terminal 100 may provide menu items to browse daily, weekly or monthly records of emotion indicative images, and output, upon selection one of the menu items and an overall emotion indicative image viewing screen containing a record of emotion indicative images corresponding to the selected menu item. Emotion indicative images and associated messages may be output together in emotion indicative image regions.

When an emotion indicative image is selected from the overall emotion indicative image viewing screen as indicated by image 1201, the mobile terminal 100 may output the selected emotion indicative image in a given size on the display unit 140 as indicated by image 1203. That is, in response to an input event selecting an emotion indicative image, the mobile terminal 100 may output the selected emotion indicative image in a full screen format on the display unit 140. To this end, the mobile terminal 100 may issue an original image request for an emotion indicative image. That is, in response to an input request for specifying an emotion indicative image to display the emotion indicative image in a given size, the mobile terminal 100 may send an original image request for the specified emotion indicative image to a mobile terminal having sent the emotion indicative image. When the original image of the specified emotion indicative image is received, the mobile terminal 100 may output the received original image on the display unit 140. in order to handle an original image request from another mobile terminal, the mobile terminal 100 may store the original image of each emotion indicative image for a predetermined time. Thereafter, upon reception of an original image request for an emotion indicative image from a second mobile terminal, the mobile terminal 100 may retrieve a stored original image of the emotion indicative image and send the retrieved original image to the second mobile terminal.

When an input event for browsing different emotion indicative images, such as a sweep or drag event, is generated at a portion of the display unit 140 in a state indicated by image 1203, the mobile terminal 100 may output a series of emotion indicative images differing from those output in a state indicated by image 1201. In particular, the mobile terminal 100 may output different emotion indicative images of the same user on the display unit 140.

Figure 13:
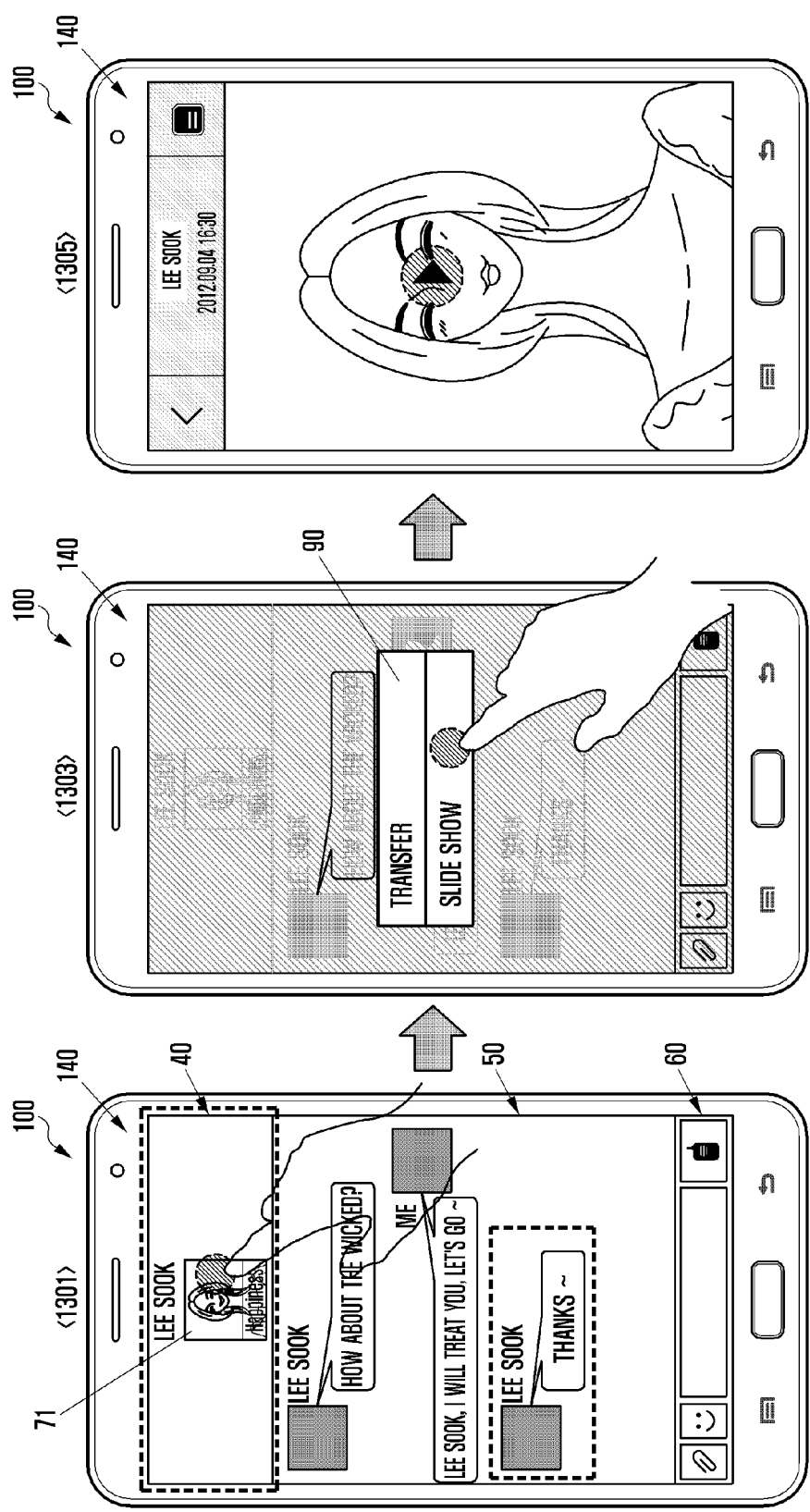
FIG. 13 and FIG. 14 show images displaying indication of emotion in a chat session according to invention principles.
Figure 14:
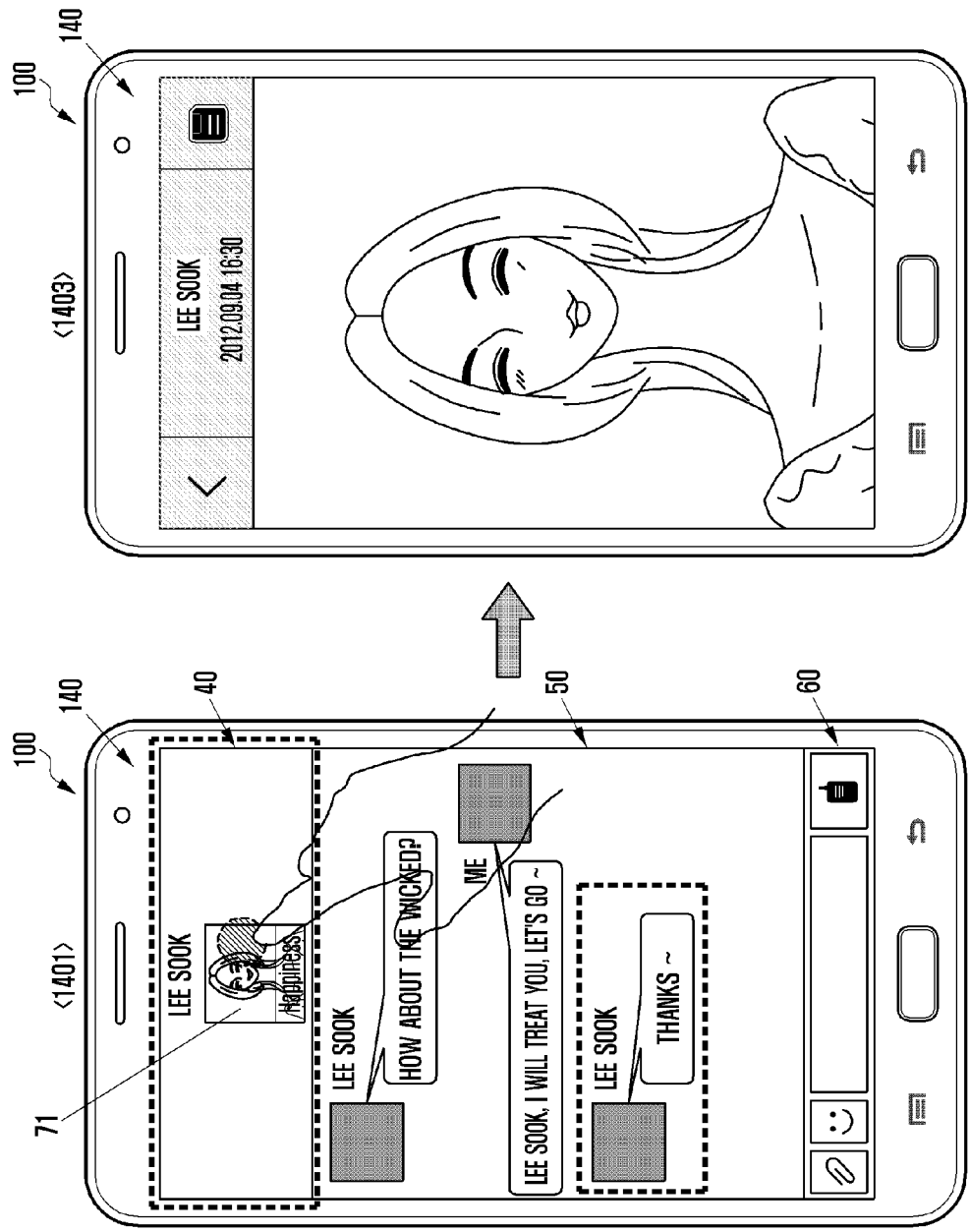

FIGS. 13 and 14 illustrate display of emotion indicative images in a chat session. The mobile terminal 100 may output a screen including an emotion indicative image region 40, a chat message region 50 and an input region 60 on the display unit 140 in response to activation of the video chat mode as indicated by image 1301. In response to a user input event selecting an emotion indicative image 71 in the emotion indicative image region 40, the mobile terminal 100 may output a menu popup window 90 containing menu items applicable to the selected emotion indicative image 71 at a region of the display unit 140 as indicated by image 1303. The menu popup window 90 is output as an overlay on the video chat screen for easy distinction.

In response to a user input event selecting a "slide show" item on the menu popup window 90, the mobile terminal 100 may perform a slide show function as indicated by image 1305. Here, the mobile terminal 100 may display emotion indicative images of a user related to the emotion indicative image 71 selected in the state indicated by image 1301 through the slide show function. During execution of the slide show function, among emotion indicative images of a given user, one emotion indicative image may be displayed for a while in a predetermined size or in a full screen format and replaced with the next emotion indicative image. If an original image of an emotion indicative image is necessary for the slide show function, the mobile terminal 100 may send an original image request to another mobile terminal and receive a corresponding original image.

When the last emotion indicative image is displayed during execution the slide show function, the mobile terminal 100 may output an end-of-slide notification and automatically terminate the slide show function. Thereafter, the mobile terminal 100 may return to the state indicated by image 1301 to continue the video chat mode. Alternatively, the mobile terminal 100 may output an end-of-slide notification and restart the slide show function by displaying the first emotion indicative image. When an input event for screen restoration is generated, the mobile terminal 100 may terminate the slide show function and return to the state indicated by image 1301.

In FIG. 14, the mobile terminal 100 may output a screen including an emotion indicative image region 40, a chat message region 50 and an input region 60 on the display unit 140 to support the video chat mode as indicated by image 1401. In response to a user input event selecting an emotion indicative image 71 output in the emotion indicative image region 40, the mobile terminal 100 may output the emotion indicative image 71 in a full screen format on the display unit 140 as indicated by image 1403. The mobile terminal 100 may send an original image request for the emotion indicative image 71 to another mobile terminal.

A slide show of emotion indicative images described in FIG. 13 and a full screen view of an emotion indicative image described in FIG. 14 may be directly activated in response to generation of a predetermined event. For example, when an emotion indicative image is selected through a long touch event, the mobile terminal 100 may provide a slide show of emotion indicative images of a user related to the selected emotion indicative image. When an emotion indicative image is selected through a double tap event, the mobile terminal 100 may output the selected emotion indicative image in a full screen format on the display unit 140.

As previously described, a facial image is captured by the camera module 170; face recognition is performed using the captured image; emotion analysis is performed using the face recognition result; and an emotion indicative image is transmitted in response to the emotion analysis result. Here, transmission of an emotion indicative image may be performed in response to detection of an emotional state change, increasing the efficiency of data transmission.

In the above description, a message function is used as a primary example of a user function based on face recognition. However, the present disclosure is not limited thereto. The user function based on face recognition may also be applied to a video call. More specifically, when the emotion analysis function based on face recognition is enabled during a video call, an emotional analysis may be performed on the basis of a preview image captured by the camera module 170; and, when an emotional state change is detected, new emotional state information and a corresponding emotion indicative image may be transmitted to the counterpart terminal without real time image transmission. That is, during a video call of the present disclosure, an emotion indicative image is transmitted in response to an emotional state change being detected without real time image transmission, significantly reducing the amount of data to be sent while sustaining a video call effect. In particular, during a video call, the mobile terminal 100 may generate an emotion indicative image using the camera module 170 at the time when a voice signal is acquired. That is, when a voice signal generated by the speaking user is acquired by the microphone MIC, the mobile terminal 100 may capture an image using the camera module 170 and perform emotional analysis using the captured image. While a voice signal is not generated, the mobile terminal 100 may deactivate the camera module 170 to reduce power consumed by the camera module 170. In addition, the mobile terminal 100 may arrange an emotion indicative image region on the display unit 140 to output emotion indicative images sent and received during the video call as described before, and may provide a variety of options for manipulating emotion indicative images.

The mobile terminal 100 may further include different components in other embodiments. For example, when the mobile terminal 100 is a communication terminal, the mobile terminal 100 may further include a local area communication module for local area communication, a data communication interface based on wired and wireless communication, an Internet communication module for Internet access and communication, and a digital broadcast reception module for receiving and playing digital broadcasts. It is apparent to those skilled in the art that the mobile terminal 100 may further include a unit comparable to the above-described units, and one unit of the mobile terminal 100 may be removed or replaced with another unit.

The mobile terminal 100 may be an information and communication appliance or multimedia appliance, such as a mobile communication terminal based on communication protocols supporting different communication systems, a portable multimedia player (PMP), a digital broadcast receiver, a personal digital assistant (PDA), a music player like an MP3 player, a portable game console, a smartphone, a laptop computer, or a handheld computer.

Hereinabove, embodiments of the present disclosure have been described with reference to the accompanying drawings. Specific terms or words used in the description should be construed in accordance with the spirit of the present disclosure without limiting the subject matter thereof. It should be understood that many variations and modifications of the basic inventive concept described herein will still fall within the spirit and scope of the system as defined in the appended claims and their equivalents.

The above-described embodiments can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. The functions and process steps herein may be performed automatically or wholly or partially in response to user command. An activity (including a step) performed automatically is performed in response to executable instruction or device operation without user direct initiation of the activity. No claim element herein is to be construed under the provisions of 35 U.S.C. 112, sixth paragraph, unless the element is expressly recited using the phrase "means for."

What is claimed is:

1. A method in a mobile terminal, comprising:
executing, by at least one processor, a chat function in communication with a destination terminal over a network;
acquiring, by a camera of the mobile terminal, an image of a target object;
detecting, by the at least one processor of the mobile terminal, whether a face is present in the acquired image, and if a face is present, analyzing by the processor the acquired image to extract facial image data and identify an emotional characteristic of the face;
comparing, by the at least one processor, the identified emotional characteristic with a corresponding emotional characteristic identified from a previously acquired facial image data for the target object;
generating by the at least one processor an emotion indicative image based on the comparing; and
displaying the generated emotion indicative image in the chat function and transmitting, by a communication unit of the mobile terminal, the generated emotion indicative image through the network to the destination terminal for display on a display screen of the destination terminal.

2. The method of claim 1, further comprising
identifying, by the at least one processor, a facial feature from the facial image data and comparing the identified facial feature with a predetermined feature associated with an emotion by feature boundary edge detection comprising a determined transition in pixel luminance; and
comparing the identified facial feature with the predetermined feature associated with an emotion in mapping information, using a transformation of the identified facial features comprising at least one of, translation, scaling and rotation operations; and
transmitting by the communication unit, when the identified emotional characteristic is identical to a previous emotional characteristic, a message indicating similarity between the identified emotional characteristic and the previous emotional characteristics without generating and transmitting another emotion indicative image.

3. The method of claim 1, wherein activating the camera is executed in response to at least one of: expiration of a time period duration in the chat, activation of a message application supporting the chat, generation of an input event for writing a message during the chat, generation of an input event for transmitting a written message during the chat, or generation of an input event for reading or replying to a received message.

4. The method of claim 1, wherein the acquiring of the image of a target object comprises at least one of:
  selecting an image from among a sequence of preview images provided by the camera; and
  acquiring an image of the target object after output of a predetermined notification.

5. The method of claim 1, wherein the emotion indicative image is generated with a predetermined size by adjusting resolution and size of the acquired image.

6. The method of claim 5, wherein the generating of the emotion indicative image further comprises inserting, by the at least one processor, textual information concerning the identified emotional characteristic into the emotion indicative image.

7. The method of claim 1, further comprising:
  in response to a determination that the acquired image does not contain a face of the target object, generating a message indicating absence of the target object; and
  transmitting the message indicating the absence of the target object to the destination terminal.

8. The method of claim 1, further comprising:
  transmitting an original emotion indicative image to the destination terminal in response to receiving an original image request.

9. The method of claim 2,
  wherein the camera is activated in response to a predetermined command;
  wherein the facial feature is identified by comparing the facial feature with a predetermined facial feature associated with an emotion;
  wherein similarity is detected between the identified emotional characteristic of the face and ta previously determined emotional characteristic of a face in a previously acquired image; and
  wherein the step of generating comprises in response to the identified emotional characteristic being dissimilar to the previously determined emotional characteristic, generating an emotion indicative image based on the acquired image and transmitting the generated emotion indicative image to a counterpart terminal, and in response to the identified emotional characteristic being similar to the previously determined emotional characteristic, transmitting a message indicating similarity between the identified emotional characteristic and the previously determined emotional characteristic.

10. The method of claim 1, wherein the step of activating comprises activating the camera in response to generation of an event, the method further comprising outputting the emotional characteristic and an emotion indicative image in response to the analyzing the facial image data.

11. The method of claim 10, further comprising:
  analyzing the facial image data to identify an emotional characteristic of the face by identifying a facial feature;
  comparing the identified feature with a predetermined feature associated with an emotion; and
  transmitting the emotional characteristic and emotion indicative image to destination terminal.

12. The method of claim 10, further comprising:
  storing the emotional characteristic and emotion indicative image; and
  temporarily storing the emotion indicative image as an original image.

13. The method of claim 10, wherein the emotional characteristic and emotion indicative images are produced by the mobile terminal or are received from the destination terminal.

14. The method of claim 10, wherein camera is activated in response to at least one of: activation of a user function, writing of a message during a chat session, issuance of a message transmission request during a chat session, and collection of a voice signal during a call.

15. A mobile terminal, comprising:
  a camera to acquire an image of a target object;
  a communication unit communicatively coupled to a destination terminal over a network; and
  at least one processor configured to:
    execute a chat function with the destination terminal over the network and acquire the image of the target object with the camera during the chat function,
    detect whether a face is present in the acquired image,
    if the face is present, analyze the acquired image to extract facial image data and identify an emotional characteristic of the face by identifying a facial feature of the face from the facial image data, and compare the identified facial feature with a predetermined facial feature associated with an emotion,
    determining similarity between the identified emotional characteristic of the face and a previously determined emotional characteristic of the face in a previously acquired image,
    in response to the identified emotional characteristic being dissimilar to the previously determined emotional characteristic, generate an emotion indicative image based on the acquired image, displaying the generated emotion indicative image in the chat function, and transmit by the communication unit the generated emotion indicative image over the network for display on a display screen of the destination terminal, and
    in response to the identified emotional characteristic being similar to the previously determined emotional characteristic, transmitting by the communication unit a message indicating similarity between the identified emotional characteristic and the previously determined emotional characteristic over the network.

16. The mobile terminal of claim 15, further comprising a display unit to display at least one of the generated emotion indicative image or an emotion indicative image received from the destination terminal.

17. The mobile terminal of claim 16, wherein the display unit is further configured to display textual emotional characteristic information overlaid on at least one emotion indicative image displayed on the display unit.

18. The mobile terminal of claim 16, further comprising a storage unit to store transmitted and received emotion indicative images.

19. The mobile terminal of claim 18, wherein the display unit is further configured to display a gallery of emotion indicative images stored in the storage unit.

20. The mobile terminal of claim 16, wherein the display unit is further configured to display a separate emotion indicative image region to be used to display emotion indicative images.

21. The mobile terminal of claim 20, wherein the display unit is further configured to:
  upon generation of an input event selecting one particular emotion indicative image in the emotion indicative image region, display the selected emotion indicative image in a full screen format, or output a slide show of emotion indicative images related to the selected emotion indicative image.

22. The mobile terminal of claim 15, wherein the at least one processor is configured to execute of at least one of: flickering effect, patterned vibration, an audible sound notification, a highlight effect, or display of a popup window, to indicate active acquisition of images by the camera.

23. The mobile terminal of claim 15, wherein the chat is configured to support at least one of an instant messaging service and a video call service.

* * * * *

UNITED STATES PATENT AND TRADEMARK OFFICE
CERTIFICATE OF CORRECTION

| | | |
|---|---|---|
| PATENT NO. | : 9,239,949 B2 | Page 1 of 1 |
| APPLICATION NO. | : 14/144950 | |
| DATED | : January 19, 2016 | |
| INVENTOR(S) | : Jeehye Jung et al. | |

It is certified that error appears in the above-identified patent and that said Letters Patent is hereby corrected as shown below:

Column 20, Claim 1, Lines 42-43 should read as follows:
--...comprising: identifying, by the...--

Column 20, Claim 2, Line 52 should read as follows:
--...facial feature comprising at...--

Column 20, Claim 2, Line 58 should read as follows:
--...emotional characteristic without generating...--

Column 21, Claim 9, Line 32 should read as follows:
--...face and a previously...--

Signed and Sealed this
Nineteenth Day of July, 2016

Michelle K. Lee
*Director of the United States Patent and Trademark Office*